US012750738B2

(12) United States Patent
Rao et al.

(10) Patent No.: US 12,750,738 B2
(45) Date of Patent: Sep. 29, 2026

(54) METHODS AND APPARATUS FOR SUPPORTING ADAPTIVE QUALITY OF SERVICE (QOS) IN SIDELINK RELAYS

(71) Applicant: INTERDIGITAL PATENT HOLDINGS, INC., Wilmington, DE (US)

(72) Inventors: Jaya Rao, Montreal (CA); Martino Freda, Laval (CA); Oumer Teyeb, Montreal (CA); Tuong Hoang, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 199 days.

(21) Appl. No.: 18/285,105

(22) PCT Filed: Mar. 30, 2022

(86) PCT No.: PCT/US2022/022604
§ 371 (c)(1),
(2) Date: Sep. 29, 2023

(87) PCT Pub. No.: WO2022/212548
PCT Pub. Date: Oct. 6, 2022

(65) Prior Publication Data

US 2024/0187935 A1 Jun. 6, 2024

Related U.S. Application Data

(60) Provisional application No. 63/308,332, filed on Feb. 9, 2022, provisional application No. 63/168,042, filed on Mar. 30, 2021.

(51) Int. Cl.
*H04W 28/22* (2009.01)
*H04L 43/0882* (2022.01)
(Continued)

(52) U.S. Cl.
CPC ......... *H04W 28/22* (2013.01); *H04L 43/0882* (2013.01); *H04W 72/02* (2013.01); *H04W 92/18* (2013.01)

(58) Field of Classification Search
CPC ..... H04W 28/22; H04W 72/02; H04W 92/18; H04W 28/02; H04W 40/02; H04L 43/0882
See application file for complete search history.

(56) References Cited

U.S. PATENT DOCUMENTS

2013/0028127 A1 1/2013 Zheng et al.
2018/0279319 A1 9/2018 Yu et al.
(Continued)

FOREIGN PATENT DOCUMENTS

WO 2019246382 A1 12/2019
WO 2020/068991 4/2020
WO 2021/030561 2/2021

OTHER PUBLICATIONS

Interdigital Inc. et al., "Discussion on QoS for L2 UE to NW Relays," 3GPP RAN WG2 Meeting #116-e, R2-2109931, Electronic (Nov. 2021).
(Continued)

*Primary Examiner* — Kan Yuen
(74) *Attorney, Agent, or Firm* — Volpe Koenig

(57) ABSTRACT

Methods and apparatus for supporting adaptive quality of service (QoS) in sidelink relays are described. A wireless transmit/receive unit (WTRU) includes a transceiver and a processor. The transceiver and the processor receive a configuration, from a wireless network, the configuration indicating an initial first hop latency budget for communications via a relay WTRU. They also receive one or more packets from a higher layer and receive an indication from the relay WTRU. The transceiver and the processor also determine an
(Continued)

updated first hop latency budget based at least on the received indication.

11 Claims, 8 Drawing Sheets

(51) Int. Cl.
*H04W 72/02* (2009.01)
*H04W 92/18* (2009.01)

(56) References Cited

U.S. PATENT DOCUMENTS

| | | | | |
|---|---|---|---|---|
| 2021/0219269 | A1* | 7/2021 | Lee | H04W 72/542 |
| 2021/0289391 | A1* | 9/2021 | Paladugu | H04W 88/04 |
| 2023/0127924 | A1* | 4/2023 | Srinivasan | H04W 28/0268<br>370/328 |
| 2023/0262513 | A1* | 8/2023 | Yu | H04W 72/02<br>370/235 |
| 2023/0262793 | A1* | 8/2023 | Deng | H04W 76/14<br>370/329 |
| 2023/0397085 | A1* | 12/2023 | Wang | H04W 40/34 |

OTHER PUBLICATIONS

Interdigital Inc., "Discussion on L2 Relay Architecture and QoS," 3GPP RAN WG2 Meeting #113-bis-e, R2-2102808, Electronic (Apr. 12-Apr. 20, 2021).
Interdigital Inc., "Discussion on QoS for L2 UE to NW Relays," 3GPP RAN WG2 Meeting #115-e, R2-2107278, Electronic (Aug. 2021).
OPPO, "New SID: Study on NR sidelink relay," 3GPP TSG RAN Meeting #86, RP-193253, Sitges, Spain (Dec. 9-12, 2019).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.4.0 (Dec. 2018).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," 3GPP TS 36.300 V16.5.0 (Mar. 2021).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," 3GPP TS 36.300 V16.7.0 (Dec. 2021).
Third Generation Partnership Project, "Technical Specification Group Radio Access Network; Study on further enhancements to LTE Device to Device (D2D), User Equipment (UE) to network relays for Internet of Things (IoT) and wearables; (Release 15)," 3GPP TR 36.746 V15.1.1 (Apr. 2018).
Third Generation Partnership Project, "Technical Specification Group Radio Access Network; NR; NR and NG-RAN Overall Description; Stage 2 (Release 16)," 3GPP TS 38.300 V16.1.0 (Mar. 2020).
Third Generation Partnership Project, "Technical Specification Group Radio Access Network; NR; NR and NG-RAN Overall Description; Stage 2 (Release 16)," 3GPP TS 38.300 V16.5.0 (Mar. 2021).
Third Generation Partnership Project, "Technical Specification Group Radio Access Network; NR; NR and NG-RAN Overall Description; Stage 2 (Release 16)," 3GPP TS 38.300 V16.8.0 (Dec. 2021).
Third Generation Partnership Project, "Technical Specification Group Radio Access Network; NR; Radio Resource Control (RRC) protocol specification (Release 16)," 3GPP TS 38.331 V16.3.1 (Jan. 2021).
Third Generation Partnership Project, "Technical Specification Group Radio Access Network; NR; Medium Access Control (MAC) protocol specification (Release 16)," 3GPP TS 38.321 V16.7.0 (Dec. 2021).
Third Generation Partnership Project, "Technical Specification Group Radio Access Network; NR; Medium Access Control (MAC) protocol specification (Release 16)," 3GPP TS 38.321 V16.4.0 (Mar. 2021).

* cited by examiner

METHODS AND APPARATUS FOR SUPPORTING ADAPTIVE QUALITY OF SERVICE (QOS) IN SIDELINK RELAYS

CROSS-REFERENCE TO RELATED APPLICATIONS

This application is the U.S. National Stage, under 35 U.S.C. § 371, of International Application No. PCT/US2022/022604 filed Mar. 30, 2022, which claims the benefit of U.S. Provisional Application No. 63/168,042, filed Mar. 30, 2021, and U.S. Provisional Application No. 63/308,332, filed Feb. 9, 2022, the contents of which are incorporated herein by reference.

BACKGROUND

For Release 16 New Radio (NR), a first version of NR sidelink has been developed, which focuses on supporting V2X related road safety services. The design aims to provide support for broadcast, groupcast and unicast communications in both out-of-coverage and in-network coverage scenarios.

SUMMARY

Methods and apparatus for supporting adaptive quality of service (QoS) in sidelink relays are described. A wireless transmit/receive unit (WTRU) includes a transceiver and a processor. The transceiver and the processor receive a configuration, from a wireless network, the configuration indicating an initial first hop latency budget for communications via a relay WTRU. They also receive one or more packets from a higher layer and receive an indication from the relay WTRU. The transceiver and the processor also determine an updated first hop latency budget based at least on the received indication.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
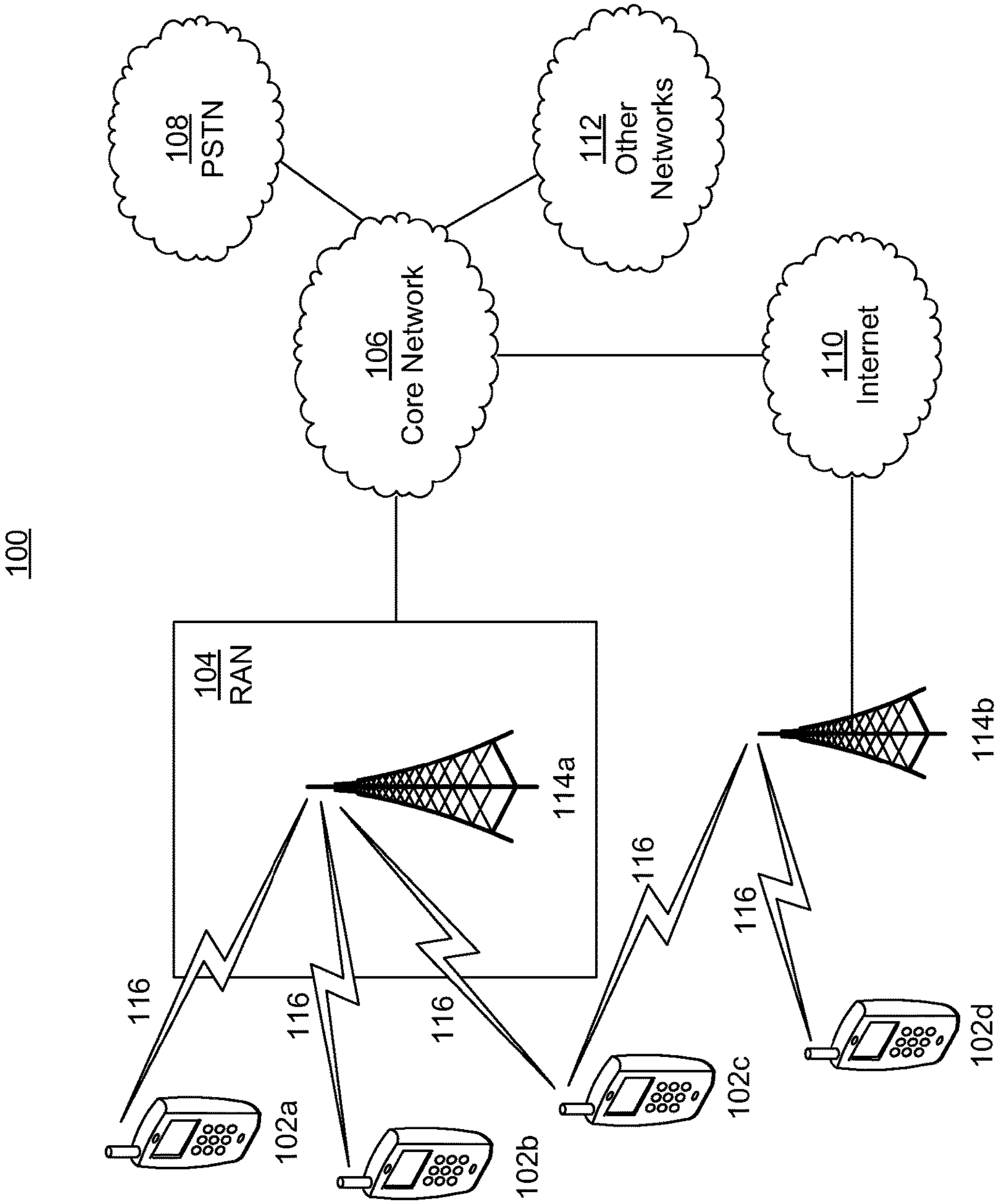
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IOT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
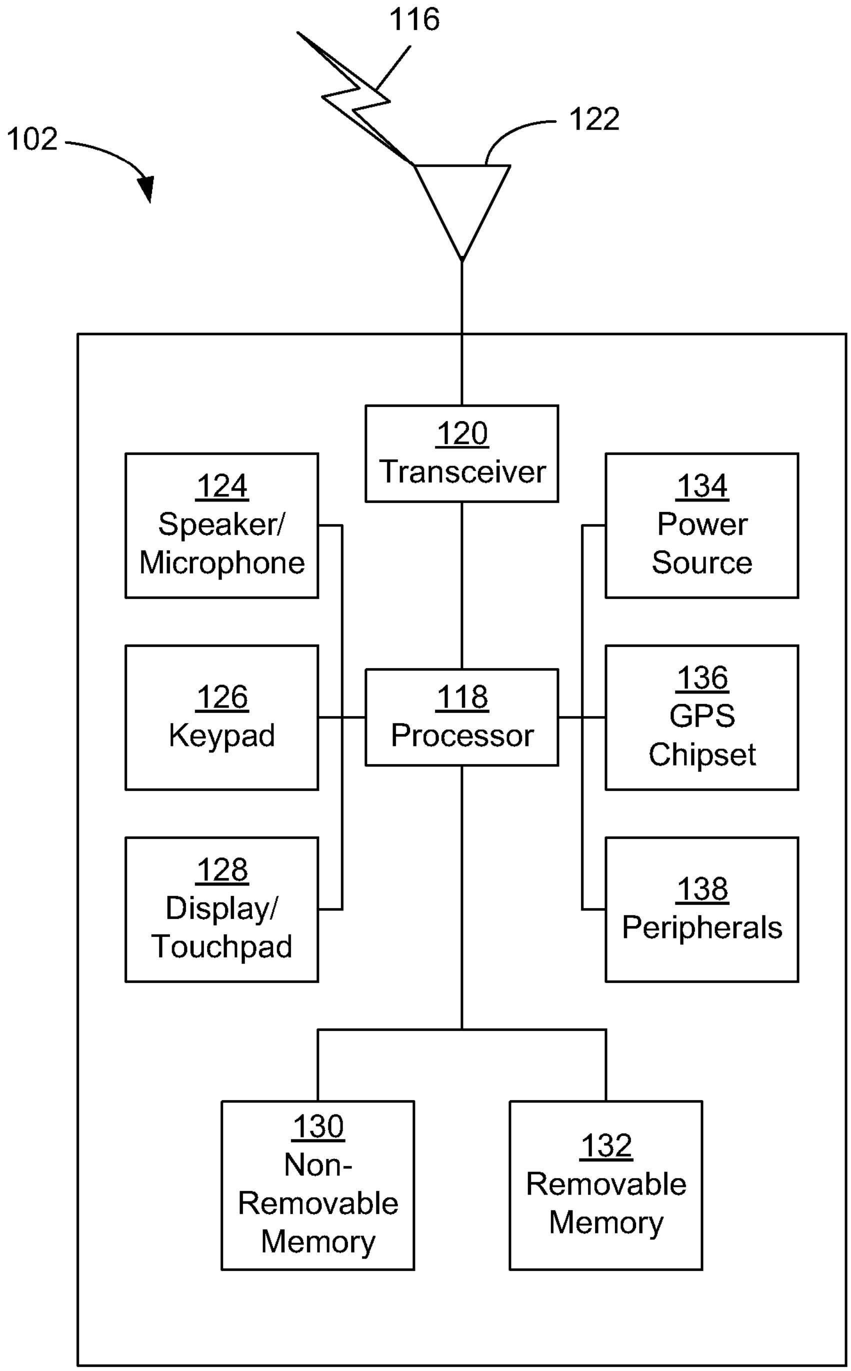
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception).

Figure 1C:
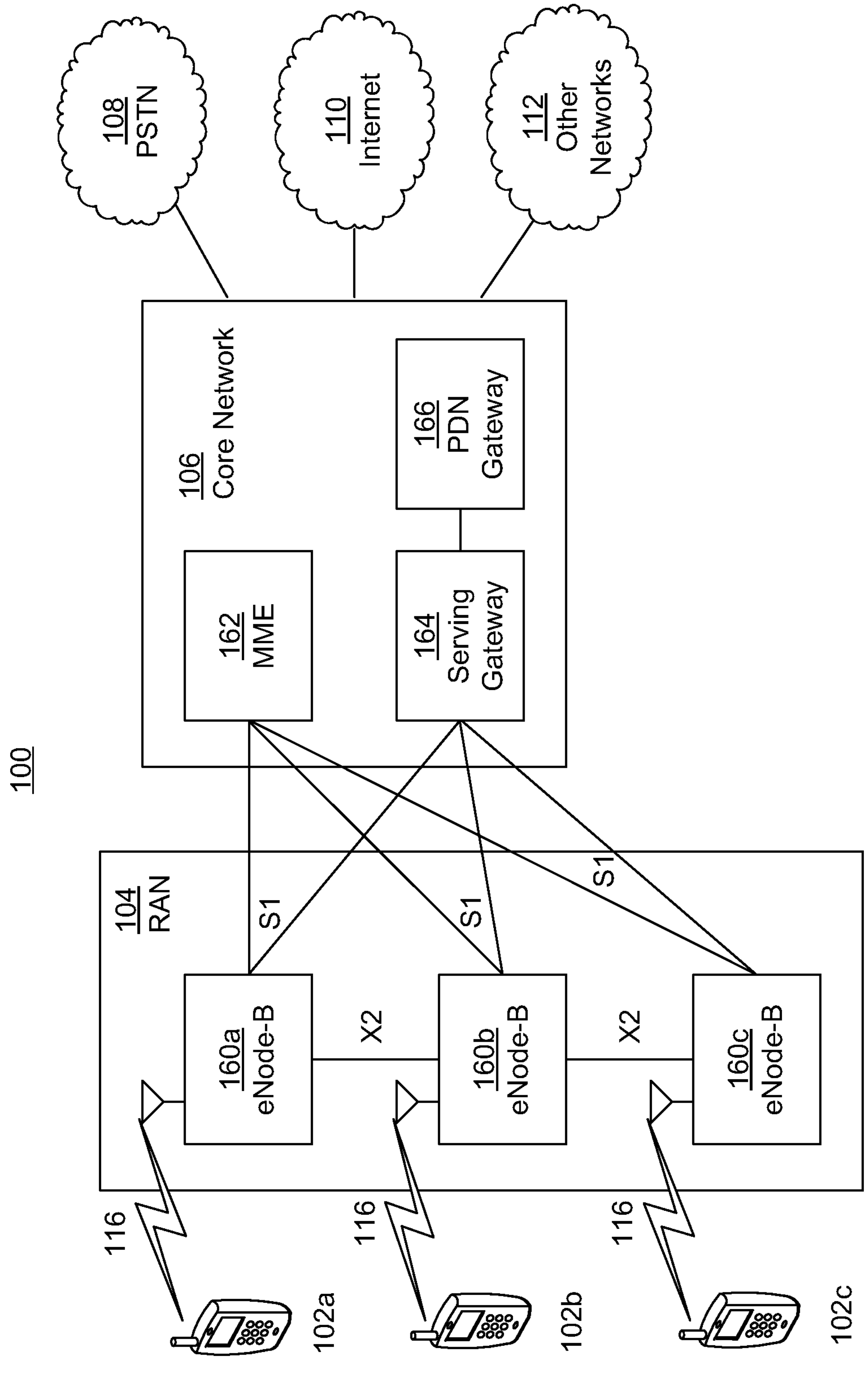
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHz, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHZ, and 20 MHz bandwidths in the TV White Space (TVWS) spectrum, and 802.11ah supports 1 MHZ, 2 MHz, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHZ. In Japan, the available frequency bands are from 916.5 MHz to 927.5 MHz. The total bandwidth available for 802.11ah is 6 MHz to 26 MHz depending on the country code.

Figure 1D:
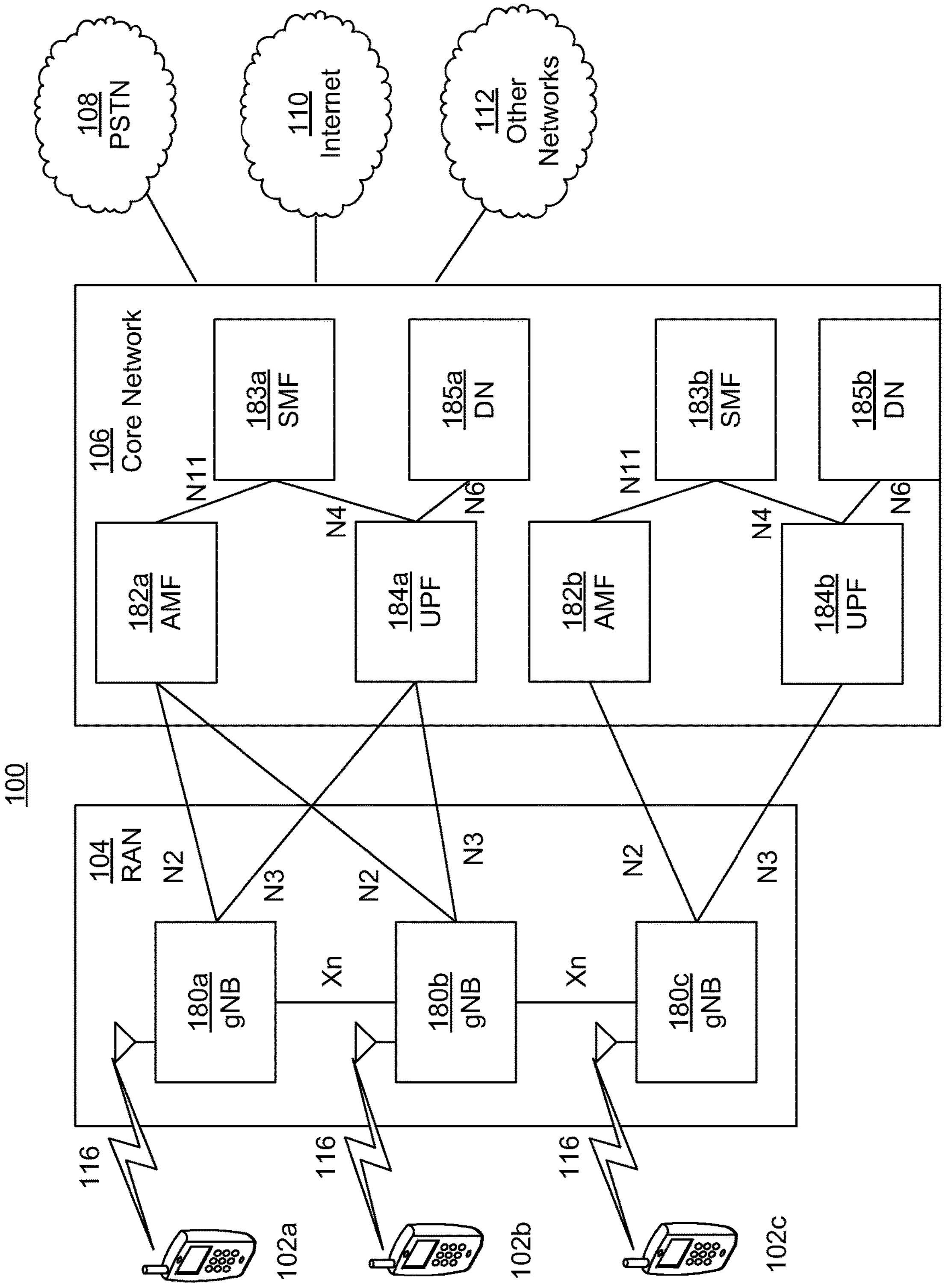
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Sidelink-based relaying functionality may be improved in terms of sidelink/network coverage extension and power efficiency improvement, considering a wider range of applications and services. For WTRU-to-network coverage extension, Uu coverage reachability may be needed for WTRUs to reach the server in a packet data network (PDN) or counterpart WTRU out of proximity area. Release 13's WTRU-to-network relaying may be limited to EUTRA-based technology, and, thus, may not be applied to NR-based systems, for both NG-RAN and NR-based sidelink (SL) communication. For WTRU-to-WTRU coverage extension, currently, proximity reachability may be limited to single-hop sidelink, either via EUTRA-based or NR-based sidelink technology. However, that may not be sufficient in the scenario where there is no Uu coverage, considering the limited single-hop sidelink coverage. Overall, sidelink connectivity may need to be further extended in the NR framework in order to support the enhanced QoS requirements.

Release 17 will study the use of both WTRU-to-network relays and WTRU-to-WTRU relays based on PC5 (sidelink). In particular, Release 17 may study single hop NR sidelink relays by studying mechanisms with minimum specification impact to support the standalone (SA) requirements for sidelink-based WTRU-to-network and WTRU-to-WTRU relays and studying mechanisms to support upper layer operations of discovery model/procedures for sidelink relaying, assuming no new physical layer channel/signal. The study of mechanisms with minimum specification impact to support the SA requirements for sidelink-based WTRU-to-network and WTRU-to-WTRU relay may focus on, for layer-3 relay and layer-2 relay, relay (re-)selection criterion and procedures, relay/remote WTRU authorization, quality of service (QoS) for relaying functionality, service continuity, security of relayed connection after SA3 has provided its conclusions, and impact on user plane protocol stack and control plane procedure (e.g., connection management of relayed connection).

Relaying via ProSe WTRU-to-Network relays was introduced in Rel13 to extend network coverage to an out of coverage WTRU by using PC5 (D2D) between an out of coverage WTRU and a WTRU-to-Network relay. A ProSe WTRU-to-Network Relay may provide a generic L3 forwarding function that can relay any type of IP traffic between the Remote WTRU and the network. One-to-one and one-to-many sidelink communications may be used between one or more remote WTRUs and the ProSe WTRU-to-Network Relay. For both the Remote WTRU and the Relay WTRU, only one single carrier (e.g., Public Safety ProSe Carrier) operation may be supported (e.g., Uu and PC5 should be same carrier for Relay/Remote WTRU). The Remote WTRU may be authorized by upper layers and can be in-coverage of the Public Safety ProSe Carrier or out-of-coverage on any supported carriers including the Public Safety ProSe Carrier for WTRU-to-Network Relay discovery, selection and/or re-selection and communication. The ProSe WTRU-to-Network Relay may always be in-coverage of EUTRAN. The ProSe WTRU-to-Network Relay and the Remote WTRU may perform sidelink communication and sidelink discovery as described in sections 23.10 and 23.11 respectively of 3GPP TS 36.300 (e.g., V15.4.0).

Relay selection/reselection for ProSe WTRU-to-NW relays may be performed based on a combination of AS layer quality measurements (e.g., RSRP) and upper layer criteria. The eNB may control whether the WTRU can act as a ProSe WTRU-to-Network Relay. If the eNB broadcast any information associated to ProSe WTRU-to-Network Relay operation, then ProSe WTRU-to-Network Relay operation may be supported in the cell. The eNB may provide transmission resources for ProSe WTRU-to-Network Relay discovery using broadcast signaling for RRC_IDLE state and dedicated signaling for RRC_CONNECTED state and reception resources for ProSe WTRU-to-Network Relay discovery using broadcast signaling. The eNB may broadcast a minimum and/or one or more maximum Uu link quality (e.g., RSRP) thresholds that the ProSe WTRU-to-Network Relay needs to respect before it can initiate a WTRU-to-Network Relay discovery procedure. In RRC_IDLE, when the eNB broadcasts transmission resource pools, the WTRU may use the threshold(s) to autonomously start or stop the WTRU-to-Network Relay discovery procedure. In RRC_CONNECTED, the WTRU may use the threshold(s) to determine if it can indicate to the eNB that it is a Relay WTRU and wants to start a ProSe WTRU-to-Network Relay discovery. If the eNB does not broadcast transmission resource pools for ProSe-WTRU-to-Network Relay discovery, then a WTRU can initiate a request for ProSe-WTRU-to-Network Relay discovery resources by dedicated signaling, respecting these broadcasted threshold(s).

If the ProSe-WTRU-to-Network Relay is initiated by broadcast signaling, it may be able to perform ProSe WTRU-to-Network Relay discovery when in RRC_IDLE. If the ProSe WTRU-to-Network Relay is initiated by dedicated signaling, it may be able to perform relay discovery as long as it is in RRC_CONNECTED. A ProSe WTRU-to-Network Relay performing sidelink communication for ProSe WTRU-to-Network Relay operation may have to be in RRC_CONNECTED. After receiving a layer-2 link establishment request or temporary mobile group identity (TMGI) monitoring request (upper layer message) from the remote WTRU, the ProSe WTRU-to-Network Relay may indicate to the eNB that it is a ProSe WTRU-to-Network Relay and intends to perform ProSe WTRU-to-Network Relay sidelink communication. The eNB may provide resources for ProSe WTRU-to-Network Relay communication.

The remote WTRU can decide when to start monitoring for ProSe WTRU-to-Network relay discovery. The remote WTRU can transmit ProSe WTRU-to-Network relay discovery solicitation messages while in RRC_IDLE or in RRC_CONNECTED depending on the configuration of resources for ProSe WTRU-to-Network relay discovery. The eNB may broadcast a threshold, which may be used by the remote WTRU to determine if it can transmit ProSe WTRU-to-network relay discovery solicitation messages, to connect or communicate with a ProSe WTRU-to-Network relay WTRU. The RRC_CONNECTED remote WTRU may use the broadcasted threshold to determine if it can indicate to the eNB that it is a remote WTRU and wants to participate in ProSe WTRU-to-Network relay discovery and/or communication. The eNB may provide transmission resources using broadcast or dedicated signaling and reception resources using broadcast signaling for ProSe WTRU-to-Network relay operation. The remote WTRU may stop using ProSe WTRU-to-Network relay discovery and communication resources when reference signal received power (RSRP) goes above the broadcasted threshold. Exact time of traffic switching from Uu to PC5 or vice versa may be up to higher layers.

The remote WTRU may perform radio measurements at the PC5 interface and use them for ProSe WTRU-to-network relay selection and reselection along with higher layer criterion. A ProSe WTRU-to-Network relay may be considered suitable in terms of radio criteria if the PC5 link quality exceeds a configured threshold (pre-configured or provided by the eNB). The remote WTRU may select the ProSe WTRU-to-Network relay, which may satisfy higher layer criterion and have best PC5 link quality among all suitable ProSe WTRU-to-Network relays. The remote WTRU may trigger ProSe WTRU-to-Network relay reselection when PC5 signal strength of the current ProSe WTRU-to-Network relay is below a configured signal strength threshold and it receives an upper layer message, such as a layer-2 link release message, from the ProSe WTRU-to-Network relay.

In release 14, a study for WTRU-to-NW relays for commercial use cases tailored to wearables and IoT devices was performed in RAN. While such study did not result in any specification, a technical report (TR) provided some preferred solutions for such relays. Contrary to ProSe WTRU-to-NW relays that use an L3 (IP layer) relaying approach, the WTRU-to-NW relays for wearables was expected to be an L2 relay.

Figure 2:
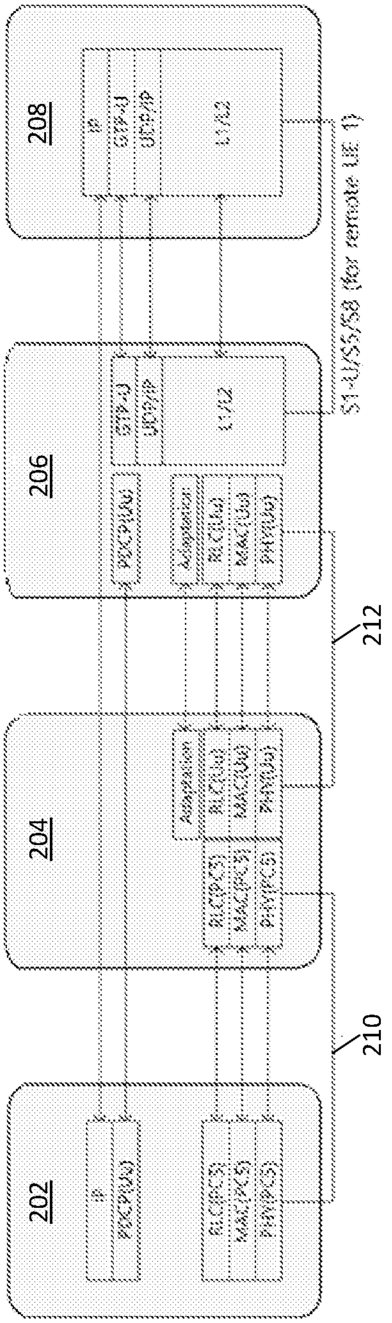
FIG. 2 is a diagram of a user plane radio protocol stack for a layer 2 evolved WTRU-to-Network relay (PC5)

FIG. 2 is a diagram of a user plane radio protocol stack for a layer 2 evolved WTRU-to-Network relay (PC5). More specifically, FIG. 2 shows the user plane radio protocol stack for at the remote WTRU 202, the L2 Relay WTRU 204, the eNB 206 and the core network 208. In the example illustrated in FIG. 2, it can be seen, for example, that RLC, MAC and PHY layer communication between the remote WTRU 202 and the L2 relay WTRU 204 may occur over the PC5 link 210, and RLC, MAC and PHY layer communication between the L2 relay WTRU 204 and the eNB 206 may occur over the Uu link 212.

Relaying, in previous releases of the LTE specification, may have been based on a one to one communication link established at upper layers (e.g., ProSe layer) between two WTRUs (e.g., the remote WTRU and WTRU-to-NW relay). Such connection may have been transparent to the AS layer, and connection management signaling and procedures performed at the upper layers may be carried by AS layer data channels. The AS layer may, therefore, be unaware of such a one to one connection.

In NR V2X (Release 16), the AS layer may support a unicast link between two WTRUs. Such unicast link may be initiated by upper layers as in the ProSe one-to-one connection. However, the AS layer may be informed of the presence of such unicast link and any data that is transmitted in unicast fashion between the peer WTRUs. With such knowledge, the AS layer can support HARQ feedback, CQI feedback, and power control schemes that may be specific to unicast.

A unicast link at the AS layer may be supported via a PC5-RRC connection. In 3GPP TS 38.300 (e.g., V16.1.1), the PC5-RRC connection may be defined as follows. The PC5-RRC connection may be a logical connection between a pair of a Source Layer-2 ID and a Destination Layer-2 ID in the AS. One PC5-RRC connection may correspond to one PC5 unicast link. The PC5-RRC signaling, as specified in sub-clause 5.X.9, can be initiated after its corresponding PC5 unicast link establishment. The PC5-RRC connection and the corresponding sidelink signaling radio bearers (SRBs) and sidelink data radio bearers (DRBs) may be released when the PC5 unicast link is released as indicated by upper layers.

For each PC5-RRC connection of unicast, one sidelink SRB may be used to transmit the PC5-S messages before the PC5-S security has been established. One sidelink SRB may be used to transmit the PC5-S messages to establish the PC5-S security. One sidelink SRB may be used to transmit the PC5-S messages after the PC5-S security has been established, which may be protected. One sidelink SRB may be used to transmit the PC5-RRC signaling, which may be protected and only sent after the PC5-S security has been established.

PC5-RRC signaling may include a sidelink configuration message (e.g., RRCReconfigurationSidelink) where one WTRU may configure the RX-related parameters of each SLRB in the peer WTRU. Such reconfiguration message can configure the parameters of each protocol in the layer 2 (L2) stack (e.g., service data adaptation protocol (SDAP), packet data convergence protocol (PDCP), etc.). The receiving WTRU can confirm or reject such configuration, depending on whether it can support the configuration suggested by the peer WTRU.

In Release 17, L2 WTRU-to-NW relays and WTRU-to-WTRU relays, mapping from N ingress RLC channels (may include RLC, MAC, and PHY channels) to one egress RLC channel may be supported at the adaptation layer of the relay WTRU. The mapping from N E2E radio bearers (may include SDAP and PDCP radio bearers) to one or more egress RLC channels may also be supported at the adaptation layer at the remote WTRU. For L2 WTRU-to-NW relays, the end to end (E2E) QoS may be split by the gNB and the RLC channels at the remote WTRU, and the relay WTRU may be configured such that the split QoS may be achievable at each hop. For WTRU-to-WTRU relays, the E2E QoS may be split based on higher layer configuration, and, correspondingly, the RLC channels at the remote WTRU and the relay WTRU may be configured such that the split QoS may be achievable at each hop.

At the relay WTRU, the congestion on PC5 links can result in the PDUs from one or more remote WTRUs being received with higher than the expected latency (e.g., higher than the packet delay budget (PDB) determined when splitting the E2E QoS). The number of remote WTRUs supported by the relay WTRU for relaying PDUs in the UL and the traffic pattern of the remote WTRUs may change dynamically, causing the congestion level as well as the QoS achievable on the PC5 link to also change dynamically. This may also cause the expected QoS over the Uu link from the relay WTRU to vary accordingly. Since the adaptation layer is supported at the relay WTRU, it may be possible to compensate for higher latency on the PC5 links by changing the mapping at the adaptation layer such that the delayed PDUs can be sent via some egress RLC channels over the Uu link that with lower latency. However, performing compensation reactively after the PDUs are received at the relay WTRU may be challenging due to delay associated with changing the configuration at the adaptation layer and possibly at the egress RLC channels. Additionally, due to the possible pending PDUs in the buffers of egress RLC channels, either from other remote WTRUs and/or relay WTRUs, any actions/mechanism for supporting QoS compensation for the PDUs delayed due to congestion on PC5 links may not be effective.

At the remote WTRU, the E2E radio bearers may carry one or more QoS flows, where the different QoS flows may have different E2E QoS requirements. Upon E2E QoS splitting, it may be possible that the different QoS flows may be split such that the QoS over the first hop PC5 link to the relay WTRU may be different. In this case, when N:1 mapping/multiplexing is supported at the adaptation layer of the remote WTRU, the PDUs belonging to different QoS flows and/or E2E radio bearers may be mapped to the same egress buffer and applied with the same configuration at the egress PC5 RLC channel (e.g., priority). Consequently, this may result in some PDUs not meeting the intended QoS over the PC5 link as a result of not differentiating the first hop QoS of each mapped PDU.

In this regard, it may be desirable to develop mechanisms that can: effectively detect and handle congestion on the PC5 link as well as loading at the relay WTRU to eliminate the scenarios where the E2E QoS when relaying may not be satisfied; ensure PDUs delayed on PC5 links can be selectively compensated without impacting other buffered PDUs at the relay WTRU when transmitting on the Uu link for meeting E2E QoS; and ensuring E2E QoS (e.g., latency) at the remote WTRU when mapping/multiplexing the PDUs belonging to different QoS flows to a single egress PC5 RLC channel, while considering the different first hop QoS over the PC5 link for the mapped PDUs.

In embodiments described herein, a remote WTRU may in some circumstances use an updated relay latency to select resources for transmission. For example, the remote WTRU may select sidelink resources for transmitting data to the relay WTRU using a determined 1st hop latency budget, which may account for additional latency due to congestion over SL and loading at the relay WTRU based on configuration info, such as E2E latency and/or 1st hop latency budget, received from the network, which may indicate loading latency received from the relay WTRU and CBR measurements.

In some embodiments, the relay WTRU may trigger changing the configuration at the LCH/MAC on the Uu link, preemptively, in preparation for receiving delayed PDUs from the remote WTRU based on a compensation mode configuration and/or compensation mode triggering conditions. For example, a relay WTRU may be configured for flexibly updating the protocol stack, including the adaptation layer (AL), and the layers in one or more ingress/egress RLC channels (e.g., including or consisting of RLC, MAC and PHY sublayers), based on the detection of one or more configured triggering conditions. At the adaptation layer of the relay WTRU, the PDUs corresponding to one or more QoS flows with the same or different E2E and/or hop by hop (H2H) QoS requirements may be mapped to one or more egress RLC channels. The one or more egress RLC channels may be configured to achieve/enforce different H2H QoS when forwarding the PDUs in the next hop. For example, the PDUs received in the ingress PC5 RLC channels may be mapped at the adaptation layer to one or more egress buffers associated with the egress RLC channels. Upon mapping to the egress buffers, the configuration at the egress RLC channel for achieving/enforcing QoS in the next-hop may be applied to all PDUs in the egress buffer.

In this regard, it is possible that the PDUs to be received from remote WTRUs may have different expected QoS to be satisfied in the subsequent hop or hops. In this case, based on the determination of the expected QoS for the PDUs received or to be received in a different ingress RLC channel, the relay WTRU may apply certain compensation mechanisms at the adaptation layer, logical channel (LCH)/MAC and/or egress RLC channels such that the expected QoS for the PDUs may be satisfied upon reception at the relay WTRU.

The term expected QoS may be used herein to denote the expected margin of a certain QoS metric (e.g., latency and data rate) before the arrival of the PDU(s) or when the PDU(s) arrive at the relay WTRU (e.g., the QoS to be achieved/enforced when transmitting in the next-hop link). In an example, the expected QoS may correspond to a time duration available at a relay WTRU for forwarding PDUs on the Uu link. The expected QoS may be determined by subtracting the achievable QoS (e.g., latency) on the first hop link from the E2E QoS, for example. In the case of DL, the expected QoS may be the QoS requirement expected to be fulfilled over the link between the relay WTRU and the remote WTRU, while in UL, it may be the QoS requirement expected to be fulfilled over the link between the relay WTRU and the gNB (in the WTRU-to-NW relay scenario).

In some examples, the expected QoS may be stricter or more relaxed than the per-hop QoS metric being used. For example, if a PDU has arrived late at the relay WTRU, having experienced more delay than the configured PC5 packet delay budget (PDB), the expected latency over the Uu link to satisfy the E2E latency requirement of the PDU may be lower than the PDB that was typically used for sending PDUs over the Uu link. Alternatively, if a PDU is expected to arrive or arrives at the relay UE well before the PC5 PDB, the expected latency budget over the Uu link to the gNB could be considered to be higher than the PDB that was normally used for such PDUs over the Uu link.

In summary, the expected QoS may vary dynamically based on the QoS experienced in the first hop (e.g., PC5 link for UL, Uu link for the DL for WTRU-to-NW relaying), where, for a fixed E2E QoS (e.g., E2E PDB, GBR) an increase/decrease in the expected QoS over the first hop link and/or relay WTRU translates to decrease/increase in the expected QoS over the next hop.

In some embodiments, a remote WTRU may be configured to perform 1:1, N:1 or 1:N mapping from one or more E2E radio bearers to one or more egress (PC5) RLC channels for enabling flexible utilization of radio bearers and resources on different hops while satisfying the E2E QoS. An RLC channel may consist of or include the RLC, MAC and PHY sublayers, where each sublayer may be, respectively, associated with one or more RLC, MAC and PHY configurations and entities, for example.

At the remote WTRU, the PDUs received via one or more radio bearers may be multiplexed/demultiplexed at the adaptation layer when mapping to the next-hop egress RLC channel, for example. When supporting 1:1 or N:1 mapping, the adaptation layer may be configured to multiplex the PDUs associated with one or more E2E radio bearers to a single egress RLC channel, for example. In another example, when supporting 1:N mapping, the adaptation may be configured to demultiplex the PDUs associated with E2E radio bearers to one or more egress RLC channels (Uu or PC5).

The E2E radio bearers, originating from a remote WTRU, may be carrying the PDUs corresponding to one or more QoS flows, where the different QoS flows may be mapped to one or more PC5 RLC channels at the remote WTRU. In this case, the different QoS flows may differ in terms of the QFI and other QoS characteristics/parameters including bitrate (e.g., guaranteed or best effort), latency and reliability, for example. Certain QoS parameters may be satisfied on both end-to-end (E2E) and hop-by-hop (H2H) basis (e.g., latency, reliability) whereas other parameters may be satisfied on either an E2E or H2H basis. For satisfying the H2H QoS requirements, the different sublayers in an RLC channel (e.g., RLC, MAC and PHY) may be configured with different configuration parameters. Such configuration parameters may include support for AM/UM in RLC, LCP rules/restrictions and associated LCH parameters (e.g., PBR, BSD, priority) at MAC and number of HARQ transmissions, for example. For E2E QoS requirements, it may be possible that certain parameters may be configured in the PDCP (e.g., sequence number size and ROCH) and SDAP (e.g., mapping between QFI and radio bearers) sublayers, for example.

In the case of WTRU-to-NW relaying, the splitting of the E2E QoS requirements into H2H requirements/budgets may be performed by the gNB based on the higher layer QoS parameters provided by the remote WTRU and/or core network functions (e.g., AMF, SMF), for example. Alternatively, the splitting may be performed based on coordination between the remote WTRU, relay WTRU and/or gNB.

In the case of WTRU-to-WTRU relaying, the splitting of E2E QoS requirements to H2H requirements may be performed by a relay WTRU and remote WTRU based on higher layer configuration when the WTRUs are out of coverage. In the case when one or more WTRUs are in coverage, the splitting may be performed with the assistance of the gNB. For example, a QoS flow with an E2E latency requirement or E2E PDB may be split to a first PDB to be satisfied on the first hop (e.g., PC5 link) and second PDB to be satisfied on the second hop (e.g., Uu link). Upon splitting the E2E QoS, the configuration at different sublayers to satisfy/enforce the H2H QoS may be performed by remote/relay WTRU and/or gNB with RRC and/or PC5 signaling, for example.

A relay WTRU may be configured with one or more conditions and/or configurations associated to the treatment/handling of data to be received at the relay WTRU (via ingress RLC channels) and/or existing data at the relay WTRU (e.g., relay WTRU's own data and data received from other remote WTRUs over ingress RLC channels). Such condition or conditions may be related to or may reflect an expected QoS to the concerned data upon arrival at the relay WTRU (e.g., considering the to be expended QoS margin over the ingress PC5 link) or a change of such expected QoS.

A relay WTRU, based on such conditions described herein, may perform any of the following actions. In some embodiments, the relay WTRU may select an LCH/MAC configuration associated with one or more egress RLC channels on the Uu link from its configured LCH/MAC configurations, which it may use when transmitting data/PDUs in the UL. The selection of an LCH/MAC configuration may be based on conditions described herein. Such embodiments may be further referred to herein as determining the LCH/MAC configuration at a relay WTRU supporting the expected QoS.

In some embodiments, a relay WTRU may trigger an LCH/MAC configuration preemptively, for compensating the change in QoS achievable on the PC5 links such that the expected data/PDUs from remote WTRUs can satisfy the E2E QoS. In such embodiments, the relay WTRU may trigger a compensation mode operation for selectively compensating the impacted PDUs to be relayed. The triggering of an LCH/MAC configuration for compensation may be based on conditions described herein. Such embodiments may be further referred to herein as triggering an LCH/MAC configuration for compensating change in achievable QoS on SL channels.

In some embodiments, a relay WTRU may trigger reporting to the network of the SL channel/loading conditions associated with one or more configured SL resource pools/bandwidth-parts (BWPs) based on conditions described herein. Such embodiments may be further referred to herein as triggering of reporting events to network the SL channel and/or loading conditions.

The relay WTRU may be configured with one or more conditions related to triggering one of the actions described above. Such conditions may be related to the expected QoS of the PDUs to be received in one or more ingress RLC channels on SL and for identifying to what extent the QoS on the next hop can be and/or whether to apply any of the embodiments described herein (e.g., changing LCH/MAC configuration and/or egress RLC channel configuration and/or triggering a reporting event to network) for meeting E2E QoS. Such conditions may dictate whether an action can/should be performed. Such conditions may dictate when (e.g., at what time instant) an action is performed (e.g., a condition/criteria is satisfied). Such conditions may be based on one or more of an indication and/or information from the network, an indication or information from a remote WTRU, buffer status and loading at ingress/egress buffers and associated RLC channels, change in configuration(s) at a relay WTRU and/or a remote WTRU, timing/timestamp information (which may be associated with expected QoS), measurements on SL/Uu, compensation based on expected QoS, property associated with the remote WTRU or link to which the RLC channel is associated, and/or a QoS property associated with the RLC channel.

Regarding indication/information from the network, for example, the relay WTRU may receive from the gNB the information on the expected QoS for transmission over the Uu link (for the case of UL) or the expected QoS for transmission over the PC5 link (for the case of DL). The information may be received semi-statically during/upon configuration of the E2E radio bearers between the remote WTRU and the gNB. The expected QoS may be indicated to the relay WTRU when configuring the adaptation layer mapping configuration, LAC/MAC configuration and/or the egress RLC channels. The relay WTRU may trigger an action (e.g., determining LCH/MAC configuration), described in the embodiments herein, based on the indication/information received from the network, for example.

The expected QoS may be indicated on the basis of per-remote WTRU, per-ingress RLC channel, per-egress RLC channel and/or per-ingress-to-egress mapping, for example. For example, the gNB may provide the expected QoS (e.g., PDB) for an egress RLC channel configured on the Uu link to the relay WTRU upon splitting the E2E QoS. When relaying in UL, the gNB may provide the expected QoS over the Uu (e.g., per egress RLC channel), and the relay WTRU may change the mapping configuration at adaptation layer and/or LCH/MAC configuration based on the received expected QoS, for example.

In another example, the relay WTRU may receive from the gNB the information on expected QoS implicitly based on one or more of the following: number of times HARQ feedback is received, allocation of retransmission grant on Uu corresponding to one or more LCHs, de-prioritization of PUSCH/grant for one or more LCHs due to intra/inter WTRU prioritization, etc. For example, the relay WTRU may be triggered to perform action(s) when receiving an indication from the network (e.g., in RRC, MAC CE, or other control PDU or DCI, such as in WTRU-to-NW relaying). The indication received by the relay WTRU may be related to the change/update in configuration at the relay WTRU and/or expected QoS associated with the one or more QoS flows relayed via the relay WTRU, for example.

Regarding indication/information from the remote WTRU, in an example, the relay WTRU may receive the semi-static information on expected QoS from the (source) remote WTRU from which the E2E radio bearers may be configured. The expected QoS may be indicated to the relay WTRU upon performing the E2E QoS splitting in the first and subsequent hop(s), for example. When relaying in UL, the remote WTRU may estimate/measure the QoS expenditure over the PC5 link, and, based on the awareness of E2E QoS, the remote WTRU may indicate the information on expected QoS (e.g., per RLC channel) to the relay WTRU for changing the configuration at egress RLC channels, for example. The relay WTRU may trigger an action (e.g., determining LCH/MAC configuration), described in the embodiments herein, based on the indication/information received from remote WTRU, for example.

For example, the relay WTRU may receive an indication from the remote WTRU indicating the arrival of one or more PDUs (e.g., in a batch/burst) prior to the reception of the PDUs. The information on the arrival of the PDUs may include the expected timing (e.g., time slot/frame) of transmission at the remote WTRU, expected timing of reception at the relay WTRU, and/or number of PDUs in the transmission from the remote WTRU, for example. In an example, the relay WTRU may receive the information on PDU arrival from the remote WTRU due to changes in the SL channel/load conditions and/or changes in the traffic arrival pattern (e.g., from higher layer) at the remote WTRU. For example, the relay WTRU may receive the information when the SL channel busy ratio (CBR) increases/decreases by a certain threshold. For another example, the relay WTRU may be triggered to perform action(s) based on an indication of priority from the remote WTRU for the relaying of PDUs. The relay WTRU may trigger an action (e.g., change LCH/MAC configuration) for relaying possibly delayed PDUs with compensation (e.g., low latency) when receiving an indication containing a priority value higher than a threshold, for example. For another example, the relay WTRU may be triggered to perform action(s) when receiving an indication from the remote WTRU (e.g., in PC5-RRC, SL MAC CE, and/or control PDU to SCI).

Buffer status and loading at ingress/egress buffers and associated RLC channels may include at least a condition associated with any of the following or combinations of measurements (e.g., compared to a threshold) such as the amount of data in one or more RLC/LCH buffers (e.g., over a period of time), the rate of arrival/departure of packets in an RLC/LCH buffer, the average, max, min size of PDUs in an RLC/LCH buffer (e.g., number of PDUs in RLC buffer), measure of the amount of time spent by one or more PDUs in an RLC/LCH buffer and/or the number of RLC/LCH buffers meeting a condition associated with the amount of data, arrival rate, and/or PDU size.

For example, a relay WTRU may perform any of the actions described herein (e.g., change the mapping configuration at the adaptation layer and/or LCH/MAC configuration) if at least one PDU in the RLC buffer for the ingress/egress RLC channel is in the buffer for a period of time larger than a threshold. For another example, a relay WTRU may perform any of the actions described herein (e.g., trigger a reporting event) if the buffer status of an ingress/ egress RLC channel exceeds a threshold. For another example, other buffer status metrics that may be monitored for determining the remaining QoS may include the number of PDUs buffered that are above/below a configured threshold and the rate of PDU arrival/departure in the buffer with respect to a configured arrival/departure rate, for example. For another example, in the case of egress buffers, the relay WTRU may also monitor the arrival/departure rate of its own traffic generated from the higher layers, which may be included in the egress buffers for transmission over the next-hop (Uu link or PC5 link). The relay WTRU may then determine or infer the expected QoS for other relayed traffic (e.g., from other ingress buffers) based on monitoring of the QoS of its own transmissions/traffic, which may use the shared/common egress RLC channels, for example. In another example, the relay WTRU may determine the number of PDUs received in an ingress RLC channel over a time duration/window for determining whether the rate of PDUs received is within the range expected for the QoS in the first hop. The relay WTRU may then use a configured mapping function to determine the expected QoS based on the achieved QoS in the first hop PC5 link, for example.

Regarding change in configuration or configurations at the relay WTRU and/or the remote WTRU, for example, the relay WTRU may be triggered to perform action(s) when changing the mapping configuration at the adaptation layer and/or LCH/MAC configuration, including changing at least one of the parameters in LCH configurations at ingress/egress RLC channels (e.g. priority, PDB, and/or PBR). For example, the relay WTRU may be triggered to perform action(s) and/or send an indication to the network and/or remote WTRU when the DRX configuration applied at the relay WTRU is modified/updated, which may impact the reception pattern and/or QoS achievable in the first-hop link at the ingress PC5 RLC channels. In another example, the relay WTRU may be triggered to perform action(s) and/or send an indication to the network when other configurations related to the PC5 RLC channel between the remote WTRU and relay WTRU is changed (e.g., HARQ is enabled/disabled on the PC5 link and/or resource pool used is changed).

Regarding timing/timestamp information, for example, the relay WTRU may track the timing related information (e.g., timestamp, marker or timing control PDU) in the one or more PDUs received in an earlier time window for determining the delay incurred over the first-hop (e.g., PC5 link for UL and/or Uu link for DL). The timing information may then be used for determining the expected QoS for upcoming PDUs, using a configured mapping function between the previously achieved first-hop QoS and the expected QoS and/or between the E2E QoS and previously achieved first-hop QoS for example.

In an example, the timing information may be indicated as a deadline/latency bound that may be satisfied on a per-hop and/or end-to-end basis. In another example, the timing information may also be indicated on a count basis (e.g., hop-count). The relay WTRU may trigger an action (e.g., determining LCH/MAC configuration), described in embodiments herein, based on the timing/timestamp information on the expected QoS, for example. In another example, the remote WTRU may send the information on the expected QoS in the next hop from the relay WTRU, which may be determined by the remote WTRU subtracting the achievable/expected first-hop QoS on the PC5 link from the E2E QoS. The expected first hop QoS may be determined by the remote WTRU based on measurements made on the PC5 link (e.g., SL channel: SL RSRP or SL load: CBR) and/or feedback (e.g., ARQ/HARQ feedback) received from the relay WTRU, for example. In an example, the remote WTRU may send the information on the expected QoS in a control PDU, MAC CE or along with other PDUs (e.g., in a PDU header).

For example, the relay WTRU may perform measurements over the one or more SL resource pools/BWPs associated with the ingress PC5 RLC channels for triggering an action (e.g., determining the expected QoS). The channel related measurements may include SL RSRP, SL-RSSI, CQI and CSI, and the load related measurements may include CBR and CR, for example. Similarly, the relay WTRU may perform measurements over the Uu link (e.g., corresponding to RSRP, RSSI, CQI and CSI), for determining the expected QoS. The channel/load measurements made over a certain configured time duration may indicate whether the PDUs received over SL are within the expected QoS range in the first-hop or have exceeded the QoS budget. The relay WTRU may also determine the expected QoS for PDUs to be received based on a configured mapping function between the SL channel/load measurements and expected QoS and/or between the E2E QoS and channel/load measurements, for example. The relay WTRU may trigger an action (e.g., determining LCH/MAC configuration), described in embodiments herein, based on the measurements on SL/Uu, for example.

In another example, the relay WTRU may determine the SL conditions based on the number of ARQ/HARQ (ACK/NACK) feedback messages and/or ARQ/HARQ retransmissions made over the one or more SL channels and resource pools associated with the ingress RLC channels. The expected QoS may then be determined based on a configured mapping function between the SL feedback/ReTx count and expected QoS, for example. As an example, a ReTx count above a threshold may translate to poor SL channel conditions, and, hence, reduced expected QoS. In another example, the relay WTRU may determine the SL channel/load conditions based on SL channel/CSI reports or/or SL load/CBR reports sent by the remote WTRU. For example, the relay WTRU may be triggered to perform action(s) and/or send an indication to the network and/or remote WTRU when channel measurements made (e.g., RSRP, RSSI, RSRQ, CQI, CSI) on the remote link (e.g., Uu link or PC5 link) increases/decreases with respect to a configured threshold and/or remains above/below a threshold for a certain time duration. For example, the relay WTRU may be triggered to perform one or more actions when one or more QoS related measurements (e.g., latency on the ingress/egress RLC channel over the previous/next hop) exceeds a certain threshold (e.g., PDB).

In another example, the relay WTRU may trigger an action, described in embodiments herein, based on determination of the time duration or change in the time duration between consecutive PDUs (e.g., new PDUs and/or retransmissions due to HARQ/ARQ) received from a remote WTRU over one or more SL channels. For example, the relay WTRU may infer an increase/decrease in the time duration between consecutive PDUs received from the remote WTRU for determining whether the congestion level on SL is high/low. In this case, for determining the time duration, the relay may set a timer when a first PDU arrives and reset the timer when a second PDU arrives from the same remote WTRU, for example. The relay WTRU may then determine the congestion level on SL based on a configured mapping between the determined time duration and CBR, for example.

Regarding compensation based on expected QoS, for example, the relay WTRU may be triggered to perform one or more actions based on determination of expected QoS for one or more PDUs to be received on SL from the remote WTRU, where the expected QoS may indicate the PDUs may be either delayed (e.g. >=PC5 PDB) or arrive early (e.g. <PC5 PDB). In this case, the relay WTRU may trigger an action such that the delayed PDUs may be forwarded over the Uu link with a determined compensation amount, for example. In an example, the action(s) may be triggered when detecting a change (e.g., higher/lower) in the expected QoS for the PDU(s) by a certain threshold. In an example, the relay WTRU may determine the delayed PDU to be sent using an RLC channel and/or LCH/MAC configuration, which may enable satisfying a compensation amount, where the compensation amount may be determined by subtracting the expected latency from the E2E latency, for example.

Regarding the property associated with the remote WTRU or link to which the RLC channel is associated, for example, a WTRU may be configured with a property specific to the remote WTRU or a unicast link such as a WTRU/link priority and/or a configuration parameter enabling/disabling the specific action for the WTRU/link. For example, a WTRU/link configured with high priority may allow the relay WTRU to change the mapping configuration of an RLC channel and/or LCH/MAC configuration (with respect to an initial or default configuration). For example, the relay WTRU may change the LCH/MAC configuration of a high priority WTRU/link as long as the change impacts only other lower priority WTRUs/links.

Regarding a QoS property associated with the RLC channel, for example, a WTRU may determine whether or not an action (e.g., change of LCH/MAC configuration) can be performed on an RLC channel depending on a QoS-related parameter (e.g., priority value) configured with that RLC channel. For example, the condition for when to perform an action (e.g., determining a Uu RLC channel configuration) may depend on a QoS-related parameter (e.g., priority value) configured with that RLC channel.

In embodiments, the relay WTRU may select or re-select an LCH/MAC configuration on the Uu link to apply for the PDUs received or to be received in one or more ingress RLC channels over SL. The LCH/MAC configuration may include one or more parameters associated with at least one logical channel (LCH) and/or MAC sublayer, including LogicalChannelConfig, Priority, PrioritisedBitRate (PBR), BucketSizeDuration (BSD), LogicalChannelGroup and/or logical channel prioritization (LCP). In an example, the relay WTRU may select an LCH/MAC configuration for satisfying the determined expected QoS for the PDUs. In another example, the relay WTRU may select an LCH/MAC configuration for compensating the change in QoS (e.g., higher latency) experienced by one or more PDUs on the SL channel, based on the determined expected QoS for the PDUs, such that the E2E QoS can be satisfied.

The selection of an LCH/MAC configuration may be made by the relay WTRU using one or more of reception (e.g., from the network) of configuration on LCH/MAC, autonomous (re)selection from a set of (pre)configured LCH/MAC configurations (which may be associated with one or more egress RLC channels, based on selection rules), dynamic activation/deactivation of one or more configured or pre-configured LCH/MAC configurations based on a condition (e.g., indication received from network and/or remote WTRU), and/or derivation of the parameters to be applied at one or more LCHs and/or MAC.

Regarding reception (e.g., from the network) of a configuration on LCH/MAC, for example, a WTRU may request a MAC/LCH configuration or reconfiguration by sending an indication to the network. The WTRU may be configured to send the indication upon any of the conditions described above being satisfied. In one example, the relay WTRU may receive configurations associated with one or more LCH/MAC configurations and/or egress RLC channels from the network. One or more of the configurations received by the relay WTRU may be associated with a compensation mode configuration, for example. In this case, the relay WTRU may use a compensation mode configuration for one or more LCH/MAC and/or RLC channel configurations when triggered based on any of the conditions described above, for example. The relay WTRU may receive the LCH/MAC configurations (e.g., from the network) based on the indication provided by the relay WTRU containing information related to the expected QoS (e.g., priority, latency, CBR measurements on SL) and/or the loading attributes associated with the ingress/egress RLC channels, for example. The LCH/MAC configurations may be received by the relay WTRU in the same or different signaling/messages (e.g., RRC, MAC CE, DCI) used for receiving radio bearer configurations and/or adaptation layer mapping configurations, for example.

Regarding autonomous (re)selection from a set of (pre) configured LCH/MAC configurations, for example, a WTRU may be configured with selection rules, based on one or more conditions described above, as to which of the (pre)configured LCH/MAC configurations is to be applied. A WTRU may further indicate to the network if it selects any of the LCH/MAC configurations or preconfigurations.

In an example, the WTRU may be configured with a default/first LCH/MAC configuration and at least one second LCH/MAC configuration. The second configuration may be applied when triggered by one or more conditions described above. For example, the second LCH/MAC configuration may be applied by the relay WTRU when performing QoS compensation and/or operating in a compensation mode. In another example, the relay WTRU may be configured or preconfigured (e.g., by a network) with one or more LCH/MAC and/or egress RLC channel configurations. The different configurations or preconfigurations may be configured with different parameters associated with the sublayers (e.g., RLC: AM/UM, MAC: LCP rules/restrictions, PBR, BSD, priority, PHY) within the RLC channel for achieving/enforcing certain QoS (e.g., delay, throughput, reliability) over the Uu link. The different configurations or preconfigurations may also be associated with different identifiers/IDs. The relay WTRU may also be configured with selection rules and conditions for assisting with the selection of an LCH/MAC configuration or preconfiguration. In this case, the relay WTRU may autonomously select a configuration or preconfiguration based on the selection rules/conditions, where the conditions may include any of the conditions described above.

For example, the selection rules may indicate selecting an LCH/MAC configuration or preconfiguration when one or more conditions are met. The conditions for selecting an LCH/MAC configuration may be related to the triggering conditions described above, for example. In an example, the conditions associated with the selection rules may be related to the expected QoS of the PDUs to be received on SL and/or the loading attributes at the relay WTRU (e.g., number of (active) egress RLC channels with PDUs in buffer). As an example, the relay WTRU may select an LCH/MAC configuration or preconfiguration on the Uu link if the expected QoS of the PDUs to be received in one or more ingress RLC channels is within a certain range (e.g., within a minimum value and maximum value for delay, bitrate and/or priority). Similarly, the relay WTRU may select an LCH/MAC configuration or preconfiguration if the load attributes are within a certain range (e.g., number of PDUs in buffer in egress RLC channels are below a threshold value and/or less than or equal to a maximum value), for example. In an example, the selection of an LCH/MAC configuration or preconfiguration based on expected QoS (e.g., latency) may enable the PDUs in the buffer and/or PDUs to be received to be sent according to a determined compensation amount. In this case, the compensation amount may correspond to the difference between the E2E QoS and the expected QoS, for example.

Regarding dynamic activation/deactivation of one or more configured or preconfigured LCH/MAC configurations based on a condition, for example, a relay WTRU may receive an activation and/or deactivation of one or more configured or preconfigured RLC configurations from the network and/or remote WTRU and may apply the activated RLC channel configuration. In another example, the one or more LCH/MAC may be dynamically activated/deactivated by the relay WTRU based on an indication received from the network (e.g., in RRC signaling, MAC CE or DCI) and/or remote WTRU (e.g., in PC5-RRC signaling, adaptation layer control, SL MAC CE, or SCI). In this case, the indication may contain the identifier/ID of the LCH/MAC configured or preconfigured to be activated/deactivated. The relay WTRU may receive the activation/deactivation indication based on other indications sent by the network/remote WTRU, which may contain information on the expected QoS and/or loading attributes associated with the RLC channels, for example.

Regarding derivation of the parameters to be applied at one or more LCHs and/or MAC, in an example, the relay WTRU may derive/determine the one or more parameters associated with the LCH/MAC configuration. In this case, the relay WTRU may be configured with a mapping rule configuration for determining the parameters associated with one or more LCH/MAC configurations. The mapping rule configuration may be used based on the expected QoS and/or loading attributes of the RLC channels determined by the relay WTRU, for example. In an example, the relay WTRU may determine one or more configuration parameters to be applied at LCH/MAC based on the mapping rule configuration that may map from the expected QoS (e.g., expected latency over egress Uu RLC channels) to the LCH/MAC configuration (e.g., LCH priority). The relay WTRU may also send an indication (e.g., to the network) upon determining and changing the LCH/MAC configuration. In the above methods, the relay WTRU may indicate the selected LCH/MAC configuration or change in the LCH/MAC configuration to the network and/or remote WTRU.

In embodiments, the relay WTRU may trigger usage of an LCH/MAC configuration for compensating the one or more PDUs that may be received on the SL channels with a QoS that is different (e.g., higher/lower) from the QoS configured on the SL RLC channels. For example, the relay WTRU may compensate for the higher-than-expected latency on the SL RLC channels (e.g., due to congestion), by triggering an LCH/MAC configuration such that the received PDUs can be transmitted in the next hop (e.g., on the Uu link) with lower latency for meeting the E2E QoS. The relay WTRU may trigger an LCH/MAC configuration, for example by selecting from one or more LCH/MAC configurations or preconfigurations and/or indicating to the network, based on a determination of expected latency for the PDUs on the next hop Uu link at the following instances: prior to the arrival of the PDUs at the relay WTRU (e.g., PDUs are not received or are not ready for transmission over the next hop) and/or upon reception of the PDUs at one or more ingress RLC channels at the relay WTRU.

The relay WTRU may trigger an LCH/MAC configuration for compensating the change in QoS over SL channels based on the one or more conditions described above. The relay WTRU may apply compensation by selecting an LCH/MAC configuration at the granularity and/or on the basis of per-remote WTRU, per-SL RLC channel and/or per-PDU group (e.g., consisting of or including one or more PDUs), for example. In an example, the relay WTRU may trigger usage of an LCH/MAC configuration when operating in a compensation mode, where, during compensation mode, the relay WTRU may use an LCH/MAC configuration that may allow to achieve a particular QoS compensation amount (e.g., latency over the Uu link). The mechanisms/actions that may be applied by the relay WTRU by triggering of LCH/MAC configuration for achieving compensation can include one or more of change in priority at LCH(s) on the Uu link, change in the LCH mapping restriction/rules, change in LCP configuration at the MAC, change in resource grant (dynamic grant/configured grant) assignment, and/or change in intra-WTRU multiplexing at MAC.

Regarding change in priority at LCH(s) on the Uu link, for example, the priority on LCHs and/or egress RLC channels may be adjusted such that the existing PDUs in the buffer and/or the received delayed PDUs can be sent with higher priority. In an example, the first priority value configured at one or more LCHs may be changed to a second priority value in anticipation of delayed PDUs. The relay WTRU may change the priority associated with an LCH configuration from a first to a second value when one or more conditions described above are met (e.g., expected QoS for PDU changes by a certain threshold).

Regarding the change in LCH mapping restriction/rules, for example, the LCH mapping restriction/rules at the relay WTRU associated with the mapping between the LCHs and the resources (e.g., dynamic grant/configured grant) may be changed such that the PDUs in the LCHs may be allowed to access suitable resources to satisfy the determined compensation amount. In an example, the rules associated with the mapping from the LCH to resources with a maximum PUSCH duration may be changed during compensation mode such that the relay WTRU may access resources, which may not be typically associated with the LCH, for sending the delayed PDUs in the LCH so long as the compensation amount is less than the max PUSCH duration.

Regarding the change in LCP configuration at MAC, for example, the relay WTRU may be configured or preconfigured with a first and a second LCP configuration to be applied to the LCH during scheduling/multiplexing at MAC. In this case, the first LCP configuration may be used during normal/typical operation and the second LCP configuration may be used during compensation mode operation for compensating any change in the expected QoS for the PDUs in one or more LCHs.

Regarding the change in resource grant (dynamic grant/configured grant) assignment, for example, the relay WTRU may use the dynamic grant/configured grant previously requested and/or allocated for sending its own PDUs or other relayed PDUs, for sending the received delayed PDU during compensation. In an example, the relay WTRU may use the grant for transmitting the delayed PDUs when the PDB associated with its own PDUs and/or other relayed PDUs are within the budget for transmission using grants in subsequent slots. For example, the relay WTRU may do autonomous transmission of its own PDUs using a second configured grant in the next transmission instance/slot, upon transmitting the delayed PDUs using the first configured grant or dynamic grant in the earlier transmission instance/slot.

For example, the relay WTRU may use one or more of configured grants with different priority values in an active BWP associated with an LCH for sending the delayed PDUs in the UL. In another example, the relay WTRU may use one or more configured grants restricted (e.g., allowedCG-List) for URLLC PDUs or other high priority PDUs for delayed PDUs during compensation. The relay WTRU may identify and use a configured grant configuration with the starting slot and duration that may be aligned with the start of compensation time and compensation duration, respectively, for the delayed PDUs, for example. In this case, the relay WTRU may send an SR to the gNB for indicating to activate the identified configured grants for sending the delayed PDUs with suitable compensation, for example.

Regarding change in intra-WTRU multiplexing at MAC, for example, the relay WTRU may change the multiplexing of PDUs in LCHs, which may include LCHs carrying delayed PDUs, associated with different priorities in the transport block during compensation. In an example, if there is overlap for PUSCH resources between low priority LCH (e.g., carrying eMBB PDUs), high priority LCH (e.g., carrying URLLC PDUs) and an LCH carrying delayed PDUs, the relay WTRU may cancel multiplexing PDUs in low priority LCHs in favor of delayed PDUs and/or high priority PDUs for UL transmission.

In embodiments, a relay WTRU may send a request to the network for triggering compensation of QoS at the relay WTRU. For example, the relay WTRU trigger request for QoS compensation for increased delay due to congestion on SL and/or relaying tasks by indicating to the network (via the request) for assistance for subsequent transmission of received PDUs on the Uu link. The relay WTRU may trigger the request preemptively for reducing any latency associated with changing the configuration at the relay WTRU and/or resource scheduling, for example. The relay WTRU may trigger the request for QoS compensation (e.g., for increased delay) due to one or more of the following: transmission over the first-hop PC5 link exceeds the QoS budget (e.g., latency on first-hop is higher due to congestion); configuration at the relay WTRU is changed/updated, including any change in mapping at the adaptation layer, change in the LCH/MAC configuration or configurations and/or change at egress RLC channel configuration or configurations; and/or loading conditions at the relay WTRU at one or more ingress/egress RLC channels change (e.g., due to arrival of PDUs from remote WTRUs or from relay WTRU's higher layer with higher priority) that may result in increased delay due to buffering. When the trigger is due to configuration at the relay WTRU being changed/updated, the network may be indicated when a change to a configuration is identified by a relay WTRU and/or the configuration is changed by the relay WTRU autonomously.

In those scenarios, the relay WTRU may send the request to the network (e.g., in SR/BSR) for requesting one or more of allocation of resources preemptively (e.g., prior to the arrival of PDUs) and/or changing one or more configurations at the relay WTRU, associated with the mapping at the adaptation layer, LCH/MAC configuration or configurations and/or RLC channel configuration or configurations for supporting possibly delayed PDUs. The relay WTRU may send the request to the network based on the one or more of the conditions described above. In an example, the relay WTRU may send the request for activating compensation mode operation in the relay WTRU, where the compensation mode may enable using one or more configured or preconfigured configurations (e.g., LCH/MAC) at the relay WTRU for achieving a particular QoS compensation amount (e.g., latency over the Uu link) for the delayed PDUs.

In embodiments, the relay WTRU may be triggered to send a report associated with the SL channel and/or load conditions to the network when detecting one or more conditions described above (e.g., CBR changes by a threshold and/or number of HARQ/ARQ retransmissions in SL is above a count). In an example, the report triggered by the relay WTRU may be intended for requesting the network to assist with meeting the expected QoS for the PDUs to be relayed.

The contents of the report sent by the relay WTRU to the network, when triggered by the above conditions, may include one or more of identifiers/IDs, timing information, information on channel/load measurements, information on QoS, information on configuration of the LCH/MAC, RLC channel or channels and/or adaptation layer applied at the remote WTRU or WTRUs, indication for suspension/resumption and/or indication for changing in transmission rate.

Regarding identifiers/IDs, for example, the relay WTRU may send the IDs of one or more ingress PC5 RLC channels or egress RLC channels. Regarding timing information, for example, the relay WTRU may send information on start/end timing and/or time duration with respect to a reference time slot for performing an action, as described in an earlier section, including the start/end of using a configuration or preconfiguration (e.g., LCH/MAC, adaptation layer mapping, egress RLC channel) at the relay WTRU. In another example, the relay WTRU may send information on the start/end timing associated with suspending and/or resuming transmissions over one or more RLC channels on PC5 link.

Regarding information on channel/load measurements, for example, the relay WTRU may send SL channel measurements (e.g., RSRP, RSSI, and/or CSI) and SL load measurements (e.g., CBR and/or CR) to the network in the report. The report containing the SL channel/load measurements may be sent by the relay WTRU based on or more conditions including periodic transmission and event triggers (e.g., expiry of a configured timer since the last transmission of report, change in RSRP and/or CBR by certain margin), for example.

Regarding information on QoS, for example, the relay WTRU may indicate the determined/estimated expected QoS (e.g., delay, throughput) achievable/enforceable on different links/hops (e.g., PC5 link, Uu link). The relay WTRU may also indicate the QoS type (e.g., GBR, non-GBR, best effort) of the traffic in the ingress/egress RLC channels. Regarding information or configuration of the LCH/MAC, RLC channel or channels and/or adaptation layer applied at the remote WTRU or WTRUs, for example, the relay WTRU may send such information of configuration to the network on one or more of the following indication messages: use of a different PC5 RLC channel by the remote WTRU, change of configuration applied at the remote WTRU (e.g., change priority applied at LCHs/PC5 RLC channels) and changing of resource pool associated with the SL RLC channel for transmitting the PDUs. When a remote WTRU changes one or multiple preconfigured mapping configurations at the adaptation layer, the relay WTRU may send the ID of the mapping applied in the indication to network.

Regarding indication for suspension/resumption, for example, the relay WTRU may send the report indicating Off/On, suspension and/or resumption of transmission from one or more remote WTRUs over the configured SL RLC channels. Regarding indication for changing in transmission rate, for example, the relay WTRU may send the report on the increase/decrease rate of PDU transmission (e.g., number of PDUs per transmission instance/slot) from the remote WTRU or WTRUs to the relay WTRU. The relay WTRU may send the report when the PDU transmission rate changes by a certain amount, for example. Alternatively, the change may be indicated as a delta value with respect to an initial/default transmission rate.

The relay WTRU may send the report to the network in one or more of RRC signaling (e.g., RRM report), SR, MA CE (e.g., BSR), UCI/PUCCH, other feedback indication (e.g., CSI report and/or HARQ feedback), data PDU (e.g., PUSCH) and/or adaptation layer indication. For example, the indication may be included within the adaptation layer header, which may be appended to the PDUs prior to sending to lower layers in RLC channel. The indication may be sent in an adaptation layer control PDU, which may be sent along with or separately with the PDUs, for example. The indication may be sent in a flow control indication PDU or other control PDUs/markers.

In embodiments, the remote WTRU may support adaptive QoS when mapping/multiplexing from one or more E2E radio bearers to one or more PC5 RLC channels. In this regard, adaptive QoS may refer to the ability to flexibly change the configuration at one or more layers of the protocol stack including mapping at adaptation layer, LCH/MAC configuration and/or RLC channel configuration for ensuring QoS in different hops and/or E2E QoS. The support for adaptive QoS may enable the PDUs associated with different QoS flows and E2E radio bearers (e.g., consisting of or including SDAP, PDCP and/or sublayers within RLC channels), which may have different E2E QoS requirements, to be mapped to the same egress buffer associated with an egress PC5 RLC channel.

In some embodiments, the remote WTRU may determine and/or apply a relative compensation factor (RCF) value or weighting value at the adaptation layer for compensating the different first-hop QoS over the PC5 link associated with the one or more E2E radio bearers. For example, the different E2E radio bearers may be configured, during/after E2E QoS splitting, with different first-hop QoS over the PC5 link to a relay WTRU. The remote WTRU may apply the RCF values at the adaptation layer when performing N:1 or N:M mapping from the radio bearers to egress RLC channels such that the different first-hop QoS associated with the radio bearers may be satisfied.

In one example, the remote WTRU may perform mapping at the adaptation layer based on the awareness of the first-hop QoS associated with the E2E radio bearers and/or a batch of PDUs (one or more PDUs per PDU batch) associated with the radio bearers. The mapping may be performed within a duration/window such that different RCF/weighting values may be applied when mapping to the egress RLC channel. In this case, when applying the RCF values to the PDUs in the different buffers associated with the E2E radio bearers, the number of PDUs that may be mapped to the egress RCL channel in a given mapping window may be proportional to the priority/weight indicated by the RCF values.

The remote WTRU may determine the RCF values to be applied at the adaptation layer based on one or more of semi-static configuration, dynamic configuration, and/or derivation of mapping configuration. Regarding semi-static configuration, for example, the remote WTRU may receive an adaptation layer mapping configuration for mapping from the first-hop QoS and/or attributes impacting the first-hop QoS (e.g., CBR measured over PC5 link and/or priority indication received from the relay WTRU) to the RCF values (e.g., priority/weight values). The mapping configuration may be received from the network (e.g., via RRC signaling) or from the relay WTRU (e.g., via PC5-RRC signaling).

The remote WTRU may be initially configured with a default mapping configuration for mapping from radio bearers to egress RLC channels at the adaptation layer. The default mapping configuration may also be associated with one or more parameters associated with the first-hop QoS (e.g., priority of the radio bearer and/or CBR measurements), which the remote WTRU may monitor/track prior to changing or sending a request for changing the default mapping configuration. In an example, the configuration applied at the egress PC5 RLC channel may also be changed/modified (e.g., by the network and/or relay WTRU) when changing or receiving a new/updated adaptation layer mapping configuration.

Regarding dynamic configuration, for example, the remote WTRU may be preconfigured with one or more adaptation layer mapping configurations for mapping from the one or more factors associated with first-hop QoS and the RCF values (e.g., priority/weight). The different mapping configurations may be identified with different IDs. The different mapping configurations may be dynamically activated/deactivated with an indication that may be received from the network (e.g., via RRC signaling, MAC CE, or DCI) or from the relay WTRU in SL (e.g., via PC5-RRC signaling, adaptation layer control PDU, SL MAC CE or SCI).

The received indication may contain the ID of the associated mapping configuration for activation/deactivation. For receiving the dynamic activation/deactivation indicator, the remote WTRU may send another indication (to network or other relay/remote WTRU) indicating the first-hop QoS associated with PDUs in radio bearers, for example. In an example, the configuration applied at the egress PC5 RLC channel upon mapping at the adaptation layer may be dynamically changed/modified when activating/deactivating a mapping configuration at the adaptation layer dynamically. In an example, the remote WTRU may send an indication to the relay WTRU and/or network when changing the mapping configuration at the adaptation layer. For example, the remote WTRU may send the indication when changing from 1:1 mapping to N:1 mapping. Additionally, an indication may also be sent when changing one or more of the RCF values applied at the adaptation layer.

Regarding derivation of mapping configuration, for example, the relay WTRU may derive/determine the RCF values (e.g., priority/weight) as a function of one or more attributes impacting the remaining QoS. In another example, the relay WTRU may derive/determine the RCF values as a function of the one or more configurations associated with the egress RLC channels, which may be configured to achieve certain expected first-hop QoS and/or load value upon mapping from the radio bearers. In one example, the relay WTRU may select or reselect an egress RLC channel. In some embodiments, the relay WTRU may select or reselect an egress RLC channel from one or more preconfigured egress RLC channels with different configurations, when determining/deriving the RCF values to be applied at the adaptation layer. In this case, the different configurations may be associated with different achievable QoS in the first-hop PC5 link. For example, the QoS in the first hop PC5 link may be achievable based on the configuration applied in the different sublayers of the egress RLC channel, including LCP rules/restrictions, LCH/MAC configuration (e.g., PBR, BSD and/or priority) and PHY configuration.

The triggering conditions for changing/updating the mapping configuration (e.g., RCF values) at the adaptation layer may include one or more of change in the traffic/PDUs in the E2E radio bearers, change in SL channel/load conditions, indication from relay WTRU and/or network, and/or indication from the relay WTRU and/or network. Regarding change in the traffic/PDUs in the E2E radio bearers, for example, the mapping configuration may be updated when the number of active radio bearers with at least one PDU increase/decrease by a certain amount. Regarding change in SL channel/load conditions, for example, the mapping configuration may be updated when one or more of the following measurements increase/decrease by certain configured threshold values: SL channel measurements (e.g., SL-RSRP, SL-RSSI, and/or CSI), SL load measurements (e.g., CBR and/or CR), CSI feedback, ARQ/HARQ feedback and number of ARQ/HARQ retransmissions. Regarding indication from relay WTRU and/or network, for example, the mapping configuration may be updated when receiving an indication (e.g., adaptation layer control PDU, flow control), which may indicate the ability/inability to compensate for decrease/increase in QoS over the first-hop PC5 link.

In embodiments, the remote WTRU may select an egress RLC channel configuration to be applied upon mapping/multiplexing at the adaptation layer based on the first-hop QoS associated with the traffic in the radio bearers. The selection of an egress RLC channel may be made by the remote WTRU using one or more of reception of configuration on egress RLC channel, autonomous selection or reselection from a set of configured or preconfigured egress RLC channel configurations based on selection rules and conditions, dynamic activation/deactivation of one or more (pre)configured RLC channel configurations based on an indication received from network and/or relay, and/or derivation of the parameters to be applied at the egress RLC channel.

Regarding reception of configuration on the egress RLC channel, for example, the remote WTRU may receive configurations associated with one or more egress RLC channels from the network and/or relay WTRUs, such as based on the indication provided by the remote WTRU. Such indication may contain information related to the first-hop QoS (e.g., priority, latency, and/or CBR measurements on SL) and/or the loading attributes associated with the radio bearers. In an example, the egress RLC channel configurations applied at the remote WTRU may have corresponding ingress RLC channel configurations applied at the relay WTRU, such as with matching parameters and/or IDs.

Regarding autonomous selection or reselection from a set of configured or preconfigured egress RLC channel configurations based on selection rules and conditions, for example, the remote WTRU may be configured or preconfigured (e.g., by the network) with one or more egress RLC channel configurations. The relay WTRU may select a preconfigured egress RLC channel configuration based on the selection rules and conditions. As an example, the selection rules may indicate selecting a configured or preconfigured X when one or more selection conditions are met. In an example, the selection conditions may be related to the first-hop QoS of the PDUs in radio bearers, SL channel/loading conditions (e.g., SL-RSRP, CBR, CR), and/or the loading attributes at the remote WTRU (e.g., number of (active) radio bearers to be mapped and/or PDUs in one or more buffers above a threshold). As an example, the relay WTRU may select a configured or preconfigured X for the egress RLC channel if the CBR measured over the resource pool in PC5 link used for transmitting to the relay WTRU is within a certain range (e.g., within a min value and max value). A (configured or preconfigured for an egress PC5 RLC channel (e.g., high PBR, high priority) that may result in low latency and/or high throughput transmission over the PC5 link may be selected when the measured CBR is determined to be below a certain threshold, for example.

In an example, the remote WTRU may select a configured or preconfigured egress PC5 RLC channel in a mapping window/duration for mapping the traffic from one of the multiple radio bearers. In this case, the selection of the egress PC5 RLC channel may be made based on matching of the QoS characteristics between the first-hop QoS of the traffic in the radio bearer and the QoS achievable/expected by the egress PC5 RLC channel, for example. For example, the remote WTRU may dynamically select a first egress RLC channel configuration for mapping the traffic/PDUs from a first radio bearer in a mapping time duration/window. The remote WTRU may then select a second egress RLC channel configuration for mapping the traffic/PDUs from a second radio bearer in the following mapping time duration/window.

In another example, the remote WTRU may select a configured or preconfigured egress PC5 RLC channel that enables to send the mapped PDUs in buffer at a higher achievable QoS (higher throughput and/or lower latency) than the required first-hop QoS for the PDUs when the SL channel/load conditions are favorable (e.g., low CBR). The remote WTRU may send an explicit indication (e.g., in a control PDU, MAC CE or SCI) to the relay WTRU for indicating a possible change in compensation (e.g., lower priority) to be applied at the relay WTRU. The change in compensation may also be indicated implicitly by the remote WTRU by using a different egress RLC channel configuration than the configuration applied at the relay WTRU when sending the PDUs. The relay WTRU may throttle the QoS (e.g., reduce transmission rate) when forwarding the PDUs in the next-hop link by changing the mapping configuration at the adaptation layer and/or changing the egress RLC channel configuration in the next-hop based on the explicit or implicit indication sent by the remote WTRU, for example.

Regarding dynamic activation/deactivation of one or more configured or preconfigured RLC channel configurations based on an indication received from network and/or relay, for example, the one or more configurations or preconfigurations associated with egress RLC channels may be dynamically activated/deactivated by the remote WTRU based on an indication received from the network (e.g., in RRC signaling, MAC CE or DCI) and/or relay (e.g., in PC5-RRC signaling, adaptation layer control, SL MAC CE, or SCI). Regarding derivation of the parameters to be applied at the egress RLC channel, for example, the remote WTRU may derive/determine the one or more parameters associated with the egress RLC channel based on a mapping rule configuration. Such configuration may be used to map from the first-hop QoS and/or loading attributes of the radio bearer to one or more configuration parameters (e.g., LCH priority, PBR, and/or BSD).

In embodiments, the remote WTRU may dynamically change the T2 bound used for resource selection or reselection for meeting the QoS (e.g., PDB) over the PC5 link when mapping/multiplexing at the adaptation layer. The remote WTRU may be configured for mapping/multiplexing the traffic from one or more E2E radio bearers, possibly with different E2E QoS, to an egress PC5 RLC channel. In this case, the first-hop QoS to be achieved by the egress PC5 RLC channel may be dependent on the amount and/or distribution of PDUs belonging to the different radio bearers during different resource selection or reselection time windows.

In one example, for a remote WTRU operating in Mode 2, the T2 bound used for the resource selection or reselection time window may be determined based on the traffic distribution in the buffer of the egress RLC channel. For example, the remote WTRU may set the T2 bound as at least the minimum of the PDB of the different PDB values required by the PDUs from different radio bearers mapped to the egress buffer in a mapping window (e.g., $T2 \leq \min(PDB_i)$, for $i=1, \ldots, N$ radio bearers).

In another example, the remote WTRU may determine the T2 bound based on the traffic/PDUs from a radio bearer that is mapped to the associated egress PC5 RLC channel in a mapping window/duration. During operation, it may be possible for the remote WTRU to change the mapping configuration, where a batch of PDUs (consisting of or including one or more PDUs) from a radio bearer may be mapped to an egress PC5 RLC channel in a mapping window. In this case, the remote WTRU may change the T2 bound at different time instances, which may be coordinated/synchronized (e.g., with suitable offset values) with the mapping window/duration used at the adaptation layer, for example. The remote WTRU may also change the value of T2 bound in accordance with the first-hop QoS of the mapped batch of PDUs, for example. As an example, the remote WTRU may use a T2 bound, which may correspond/match with a first PDB value for a first batch of PDUs in a given time window. Subsequently, the remote WTRU may use another T2 bound, which may correspond to a second PDB value for a second batch of PDUs in the next time window.

In embodiments, the remote WTRU may determine whether to send or drop one or more PDUs based on the first-hop QoS, E2E QoS and the associated T2 bounds for resource (re)selection. The remote WTRU may be configured with one or more egress PC5 RLC channels for carrying the PDUs/traffic associated with E2E radio bearers/QoS flows via a relay WTRU to the network or next-hop WTRU. Upon performing QoS splitting, the network and/or higher layers (e.g., in the relay/remote WTRU) may indicate the first-hop QoS and/or E2E QoS to the remote WTRU. Subsequently, the first-hop QoS may be used for configuring one or more egress PC5 RLC channels and/or for determining the parameters associated with resource (re)selection, such as for operating in Mode 2.

In one example, the remote WTRU may use the information/requirements associated with the first-hop QoS (e.g., PDB) for determining the T2 bound related to a resource selection time window, which may be used for resource (re)selection from one or more configured SL resource pools. As an example, for a first-hop PDB value of T ms, the T2 bound may be set to be less than or equal to T ms. In the case of single-hop transmission over a PC5 link, when the remote WTRU is unable to reserve sufficient resources from the resource pool within the T2 bound, the PDUs intended for transmission may be dropped. However, in the relaying scenario, since the PDUs may be relayed over the subsequent hops by the relay WTRU, it may be possible for the relay WTRU to compensate for any increase in the delay on the first-hop PC5 link. In this case, the remote WTRU may be configured with one or more T2 bounds that may be used in determining whether the PDUs may be dropped or forwarded to the relay WTRU.

In an example, the relay WTRU may be configured with a first T2 bound ($T2_1$) and a second T2 bound ($T2_2$), where the first T2 bound may be determined from the initial first-hop QoS (e.g., $PDB_1$) received upon E2E QoS splitting and the second T2 bound may be determined as a function of the E2E QoS and the next-hop QoS (e.g., QoS achievable/expected at the relay WTRU). For a transmission with an E2E latency requirement, given a next-hop PDB (e.g., $PDB_2$ for transmission from the relay WTRU to the network/remote WTRU), which may range between a min $PDB_2$ and max $PDB_2$ value, the first T2 bound and second T2 bound may be determined as $T2_1$=E2E PDB−max $PDB_2$ and $T2_2$=E2E PDB−min $PDB_2$ respectively, for example.

The remote WTRU may determine the first and/or second T2 bounds based on the indication received from the network and/or relay WTRU. For example, the remote WTRU may receive the explicit min/max PDB values associated with the next-hop link for determining the T2 bounds. Alternatively, the remote WTRU may determine the T2 bounds via implicit indications (e.g., change in loading at relay, change in CBR) received from the network/relay WTRU and a mapping rule between the information in the indications and the T2 bounds, for example.

Based on the determined T2 bounds, the remote WTRU may perform the following for sending the PDUs. One or more PDUs may be sent to the relay WTRU when sufficient SL resources may be selected in less than or equal to the first T2 bound. An indication for QoS compensation may be sent along with the one or more PDUs to the relay WTRU when sufficient SL resources may be selected within the window ranging from the first T2 bound to the second T2 bound. One or more PDUs may be dropped, when sufficient SL resources are unable to be selected in greater than or equal to the second T2 bound.

In embodiments, the remote WTRU may perform mapping/multiplexing at the adaptation layer to an egress PC5 RLC channel based on the similar/uniform first-hop QoS required/achievable for the PDUs in one or more radio bearers. The remote WTRU may be (pre)configured with one or more egress PC5 RLC channels, where the different configurations or preconfigurations may be associated with a set of configuration parameters at different sublayers (e.g., RLC: AM/UM, MAC: LCP rules/restrictions, PBR, BSD, priority, PHY: HARQ enablement) for achieving certain QoS over the PC5 link. The remote WTRU may also be configured with one or more E2E radio bearers, for carrying PDUs associated with QoS flows to the network or a next-hop remote WTRU via a relay WTRU. In this case, the E2E QoS for the QoS flows may be split by the network or the remote/relay WTRU and configured in the remote WTRU for achieving the first-hop QoS with the egress PC5 RLC channels. Subsequently, the remote WTRU may map the different E2E radio bearers to the one or more egress PC5 RLC channels at the adaptation layer.

The different E2E radio bearers and associated QoS flows that are configured with the same/similar first hop QoS, upon QoS splitting, may be mapped/multiplexed at the adaptation layer to an egress PC5 RLC channel that is configured to achieve a QoS that may support one or both of the following: QoS of PC5 RLC channel matches with the first-hop QoS associated with the radio bearers and accommodate the traffic load associated with the mapped radio bearers.

Regarding QoS of PC5 RLC channel matches with the first-hop QoS associated with the radio bearers, for example, a PC5 RLC channel may be selected for mapping if the corresponding QoS achievable (e.g., first PDB) is within a min/max range associated with the first hop QoS of a radio bearer (e.g., second PDB). The QoS achievable by the PC5 RLC channel may be determined by the remote WTRU based on a mapping function that maps from the one or more configuration parameters applied at the different sublayers (e.g., priority, PBR) to one or more QoS attributes (e.g., PDB, bitrate). The QoS achievable over the PC5 link by a PC5 RLC channel may vary dynamically as a result of SL channel (variations in SL RSRP, CSI) and/or load conditions (variations in CBR), for example. In this case, the mapping configuration at the adaptation layer may be changed such that the radio bearers with similar/uniform first hop QoS are mapped to an egress PC5 RLC channel, such as with matching updated QoS, for example. Regarding accommodating the traffic load associated with the mapped radio bearers, for example, the number of active radio bearers (e.g., non-empty radio bearers with at least one PDU) that may be mapped/multiplexed to an egress PC5 RLC channel may be less than or equal to a max number/load value that may be supported by the egress RLC channel.

In one example, the remote WTRU may select from one or more configurations or preconfigurations and/or are configured with a mapping configuration that may be applied at the adaptation layer for mapping from the radio bearers to a suitable egress RLC channel that may support the first-hop QoS of the traffic in the radio bearers. In another example, the remote WTRU may dynamically change and/or configure the mapping configuration at the adaptation layer that enables mapping/multiplexing the traffic in the radio bearers to a suitable egress PC5 RLC channel based on matching QoS attributes. For example, the remote WTRU may change/update the RCF values in the adaptation layer mapping configuration that results in mapping/multiplexing the traffic from radio bearers to a selected egress PC5 RLC channel.

In embodiments, the remote WTRU may send an indication related to compensating QoS to the relay WTRU when unable to meet the QoS budget on the first hop PC5 link. In an example, the remote WTRU may send a compensation indication to inform the relay WTRU to compensate for higher than expected latency on the PC5 link for the PDUs to be transmitted via a PC5 RLC channel. The compensation indication may include the compensation QoS value to be applied at the relay WTRU, which may include one or more of priority to be applied for transmission in next-hop, revised delay budget to be achieved for transmission in next-hop, and/or revised throughput or bit-rate to be achieved for transmission in next-hop.

Regarding priority to be applied for transmission in next-hop, for example, the priority to be applied may be the same (e.g., existing) priority applied at the PC5 RLC channel (e.g., LCG priority) during configuration, when the PC5 link is able to support the expected first-hop QoS. Alternatively, when first-hop QoS is not achievable, the priority value may be revised for indicating the QoS to be achieved/compensated in the subsequent hop or hops at the relay WTRU. For example, the remote WTRU may indicate a higher revised priority for transmission in next-hop when unable to meet the first-hop QoS with the existing priority. Regarding the revised delay budget to be achieved for transmission in next-hop, for example, the remote WTRU may indicate to relay WTRU the revised PDB (e.g., lower than the configured PDB) to be used when transmitting in the next hop, when the PDB in the first-hop is unable to be met. Regarding the revised throughput or bit-rate to be achieved for transmission in next-hop, for example, the remote WTRU may indicate the revised throughput to be achieved in the next-hop by the relay WTRU for compensating for possible loss in throughput in the first hop. The revised throughput may be a indicated in different metrics including bit-rate and PDUs per unit time, for example.

The remote WTRU may determine the compensation QoS value in the compensation indication for sending to the relay WTRU based on one or more of measurements made over the egress PC5 RLC channels and/or mapping rule configuration for mapping between measurements over resource pool associated with egress PC5 RLC channel and compensation QoS value (e.g., revised priority, PDB, throughput). Regarding measurements made over the egress PC5 RLC channels, for example, the measurements may include SL channel measurements (e.g., SL-RSRP and/or CSI) and/or SL load measurements (e.g. CBR and/or CR). The compensation indication may be sent when the measurements made are above/below a configured threshold, for example. Regarding mapping rule configuration for mapping between measurements over resource pool associated with egress PC5 RLC channel and compensation QoS value (e.g., revised priority, PDB, throughput), for example, if the measurements made (e.g., CBR) over the resource pool used in the first-hop PC5 link are within a certain range (e.g., tolerable range for achieving an expected PDB/throughput) and/or above/below a configured threshold, the existing/default parameter value (e.g., priority) applied in PC5 RLC channel configuration may be used as the compensation QoS value in the compensation indication (e.g., no compensation). Otherwise, the compensation QoS value (e.g., revised priority) may be determined using the mapping rule between the measurements and compensation QoS value. For example, a higher revised priority value may be used when the measured CBR is above a threshold for indicating to the relay WTRU to compensate for higher delay on the PC5 link.

In embodiments, the remote WTRU may send an indication to the relay WTRU and/or network based on triggering conditions associated with the mapping at the adaptation layer and/or first-hop QoS. The contents of the indication may include at least one or more of identifier/IDs of radio bearers and/or PC5 RLC channels, mapping configuration ID, number of E2E radio bearers mapped to egress RLC channel, load information related to the E2E radio bearers, QoS flow ID, path/route ID and/or QoS related information.

Regarding identifier/IDs of radio bearers and/or PC5 RLC channels, for example, the remote WTRU may send the IDs of one or more E2E radio bearers in the case of WTRU-to-NW relaying and IDs of sidelink radio bearers in the case of WTRU-to-WTRU relaying. The information on radio bearer IDs may be applicable for both L2 and L3 radio bearer types, for example. The remote WTRU may also indicate the one or more IDs associated with the PC5 RLC channels, to which the radio bearers may be mapped, for example.

Regarding the mapping configuration ID, for example, if the remote WTRU applies one of the mapping configurations at the adaptation layer, the ID of the mapping configuration may be included in the indication. The remote WTRU may include the mapping configuration ID or IDs when performing the mapping update in any of the following combinations: N:1 to 1:1 and vice-versa, N:1 to 1:N and vice-versa, 1:N to 1:1 and vice-versa. Regarding the number of E2E radio bearers mapped to egress RLC channel, for example, in the case when the remote WTRU performs N:1 mapping, the remote WTRU may indicate the number of radio bearers that are mapped to an egress PC5 RLC channel. Regarding load information related to the E2E radio bearers, for example, the remote WTRU may indicate the load of the N radio bearers mapped to a PC5 RLC channel. The load of a radio bearer may be indicated in terms of the data/bit rate (total or average), PDU count, and percentage of buffer occupancy, for example.

Regarding flow ID, for example, the remote WTRU may indicate information on the QoS flow IDs (e.g., QFI) and the associated PDUs that are carried in the radio bearers which may be subsequently mapped to an RLC channel. Regarding path/route ID, for example, the path ID indicated may correspond to the E2E L2 ID (source/remote WTRU ID, final destination ID) or other E2E routing IDs that may be used to assist the relay WTRU with traffic routing to the next hop node (e.g., gNB, destination WTRU). In addition, the path ID may also correspond to the L2 ID of the PC5 link between the remote WTRU and relay WTRU, for example.

Regarding QoS related information, for example, the remote WTRU may include in the indication information for ensuring/enforcing E2E QoS. The QoS information may include latency related information (e.g., timestamp indicating the start time upon mapping the PDUs from radio bearers to PC5 RLC channel, expected latency on PC5 link for transmitting to relay WTRU, expected remaining time available at the relay WTRU for relaying to next-hop node on Uu link/PC5 link) to assist with scheduling and forwarding at relay WTRU, for example. The remote WTRU may indicate the priority value assigned to the radio bearer, where the priority may refer to the per-radio bearer priority or per-RLC channel priority when N:1 mapping from multiple radio bearers to an RLC channel is performed, for example. The remote WTRU may indicate revised priority values assigned to one or more PC5 RLC channels when indicating to the relay WTRU to compensate for possible inability to meet the QoS budget (e.g., PDB) on the first-hop PC5 link, for example. The remote WTRU may also indicate the QoS type (e.g., GBR, non-GBR, best effort) of the radio bearer mapped to at the PC5 RLC channel at the adaptation layer.

The remote WTRU may send the indication, consisting of or including at least one of the above information, to the relay WTRU associated with the (egress) PC5 RLC channels when sending the PDUs over the SL/PC5 link. The remote WTRU may send the indication when triggered by one or more of the following: when changing/updating mapping configuration at the adaptation layer and/or configuration of egress PC5 RLC channel and/or when determining change in the achievable QoS over the first-hop PC5 link. Regarding when changing/updating mapping configuration at adaptation layer and/or configuration of egress PC5 RLC channel, for example, the remote WTRU may indicate the information on the updated/changed mapping configuration (e.g., ID of mapping configuration, RCF values changed) to the relay WTRU. The relay WTRU may also indicate the parameter values and/or IDs of the updated egress RLC channels. Regarding when determining change in the achievable QoS over the first-hop PC5 link, for example, the remote WTRU may determine whether the QoS budget over the first-hop PC5 link may/may not be met based on a configured mapping between the QoS achievable and one or more of the following measurements: SL channel measurements (e.g. SL-RSRP, CSI), SL load measurements (e.g. CBR, CR), CSI feedback, ARQ/HARQ feedback and number of ARQ/HARQ retransmissions. In this case, the remote WTRU may be triggered to send an indication when the determined QoS and/or one or more of the above measurements are above/below a threshold/range, for example.

The remote WTRU may also send the indication to the network (in WTRU-to-NW relaying) or to the destination WTRU (in WTRU-to-WTRU relaying) when changing the mapping configuration dynamically, for example. In this case, the indication may be sent via the relay WTRU (e.g. transparently) using E2E RRC signaling or E2E PC5-RRC signaling, respectively, as an example. In the case when the remote WTRU may have direct links (Uu or PC5) available to the network or destination WTRU, the indication may be sent directly without relaying.

The remote WTRU may send the indication to the relay WTRU in at least one of the adaptation layer header, the adaptation layer control PDU and/or other signaling. Regarding the adaptation layer header, for example, the indication may be included within the adaptation layer header, which may be appended to the PDCP PDUs associated with the radio bearers, prior to sending the PDUs to the PC5 RLC channels. Regarding the adaptation layer control PDU, for example, the control information may be sent in an adaptation layer control PDU, which may be sent to the lower layers as a separate adaptation layer PDU. Regarding other control signaling, for example, the indication may be sent either in PC5-RRC, SL MAC CE or SCI.

In embodiments, a WTRU may operate in a compensation mode to ensure QoS is pre-compensated prior to data transmission. A remote WTRU may operate in a QoS compensation mode to make adjustments to configurations applied when transmitting data to the network (e.g., base station/gNB) via a relay WTRU, which may prevent potential QoS degradation, based on detection of triggering events/conditions described herein. The operation in QoS compensation mode may involve the remote WTRU transitioning from a default or first mode/set of actions to a different or second mode/set of actions over a certain duration, which may ensure the achievable QoS during data transmission remains stable.

The operation in QoS compensation mode, including a set of actions, procedures, rules/restrictions and configuration parameters, may be configured in the remote WTRU (e.g., by the network via RRC signaling) and/or dynamically activated/deactivated. The remote WTRU may operate in QoS compensation mode to ensure the QoS requirements (e.g., latency, data rate, and/or reliability) may be met during data transmissions, for example. The remote WTRU may transition/fall back to operating in the default mode/set of actions when detected triggering events/conditions are no longer observed, which may be for a certain configured time duration, for example.

Figure 3:
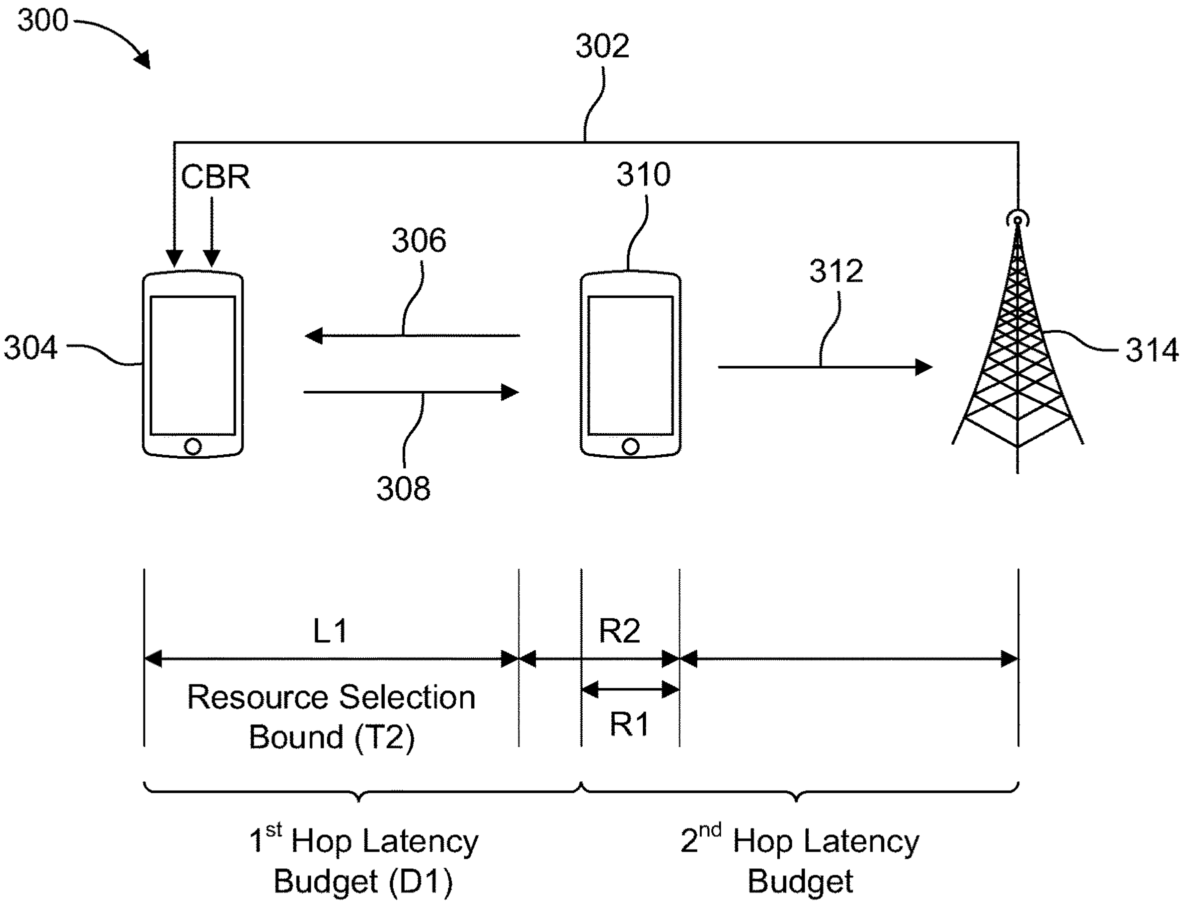
FIG. 3 is a system diagram of an example of a remote WTRU, a relay WTRU and a base station (e.g., gNB) operating in an example QoS compensation mode.
Figure 4:
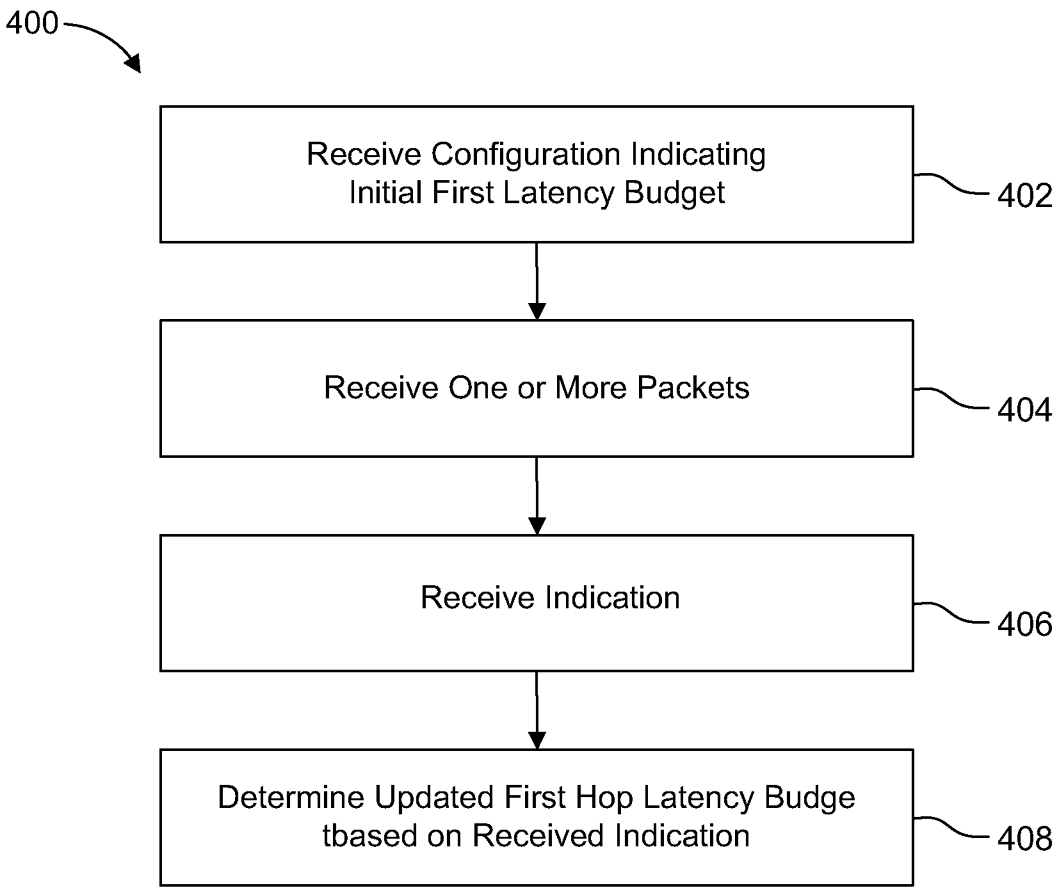
FIGS. 4 and 5 are flow diagrams of example methods of supporting adaptation QoS in sidelink relays, which may be implemented at the remote WTRU and the relay WTRU, respectively, in a system such as illustrated in FIG. 3.
Figure 5:
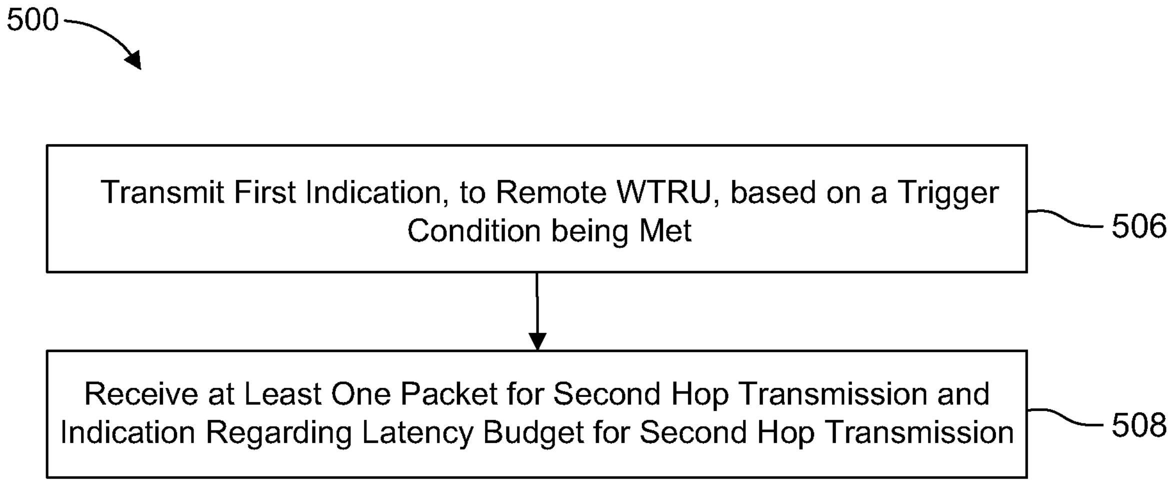

FIG. 3 is a system diagram of an example of a remote WTRU 304, a relay WTRU 310 and a base station (e.g., gNB) 314 operating in an example QoS compensation mode. FIGS. 4 and 5 are flow diagrams of example methods of supporting adaptation QoS in sidelink relays, which may be implemented at the remote WTRU and the relay WTRU, respectively, in a system such as illustrated in FIG. 3.

With reference to FIGS. 3 and 4, a remote WTRU 304 may be configured with a configuration 302 that indicates a first latency budget (402). In the example illustrated in FIG. 3, the remote WTRU 304 receives the configuration 302 from the gNB 314. The first latency budget may be a first hop latency budget D1. Instead of, or in addition to, the first latency budget, the configuration may include a default relay latency R1 and/or a CBR threshold. The first hop latency budget is shown in FIG. 3 as D1.

The remote WTRU 304 may receive one or more packets (404). In some embodiments, the packets may be PDUs. Although not shown in FIG. 3, the packets may be received from a higher layer or layers.

The remote WTRU 304 may receive an indication (406). In the example illustrated in FIG. 3, this updated relay latency 306/R2 may be received from the relay WTRU 310. The indication may be, for example, an indication of an updated relay latency but could be other indications consistent with the embodiments described herein.

The remote WTRU 304 may determine an updated first hop latency budget (L1 in FIG. 3) based on the received indication (408). The updated first hop latency budget may be determined, for example, by subtracting a second hop latency and an updated relay latency 306/R2 from the E2E latency and adding the configured default latency R1.

In some embodiments, the remote WTRU 304 will compare the updated first hop latency budget L1 with the initial first hop latency budget D1. Based on L1<D1, the remote WTRU 304 may perform CBR measurements of a resource pool over SL to the relay WTRU 310. Based on CBR<CBR threshold, the remote WTRU 304 may select resources using the initial first hop latency D1 as the resource selection bound T2. The remote WTRU 304 may determine a compensation amount for the relay WTRU 310 based on E2E latency, the initial first hop latency budget D1 and the updated relay latency R2. The remote WTRU 304 may transmit the packets and an indication to the relay WTRU 310 (shown as 308 in FIG. 3). The indication may include, for example, one or more of information or a request for the relay WTRU 310 to compensate by a compensation amount (e.g., an associated high priority value). Based on CBR≥CBR threshold, the remote WTRU 304 may select resources by using the updated first hop latency budget L1 as the resource selection bound T2. The remote WTRU 304 may transmit the packets and an indication to the relay WTRU 310 (shown as 308 in FIG. 3). The indication may include, for example, information regarding use of L1 (e.g., an associated high priority value).

Based on L1≥D1, the remote WTRU 304 may select resources by using the initial first hop latency budget D1 as the resource selection bound T2. The remote WTRU 304 may transmit the packets and an indication to the relay WTRU 310 (shown as 308 in FIG. 3). The indication may include, for example, information regarding use of D1 (e.g., an associated priority value).

On the end of the relay WTRU 310, in some embodiments, the remote WTRU 310 may determine or otherwise be triggered to send the indication to the remote WTRU 304 (506). As mentioned above, the indication may be an indication of updated relay latency information R2 The relay WTRU 310 may receive at least one packet for second transmission and a second indication regarding a latency budget for the second hop transmission from the remote WTRU 304 (shown as 308 in FIG. 3). The trigger condition can be one or more of any number of trigger conditions including, for example, the WTRU receiving an indication from the network, the WTRU receiving an indication from the remote WTRU, a buffer status, loading at one or more of ingress or egress buffers, a change in a configuration at the relay WTRU, a change in a configuration at the WTRU, timing information, a measurement of a sidelink, and expected quality of service. The information regarding the latency budget for the second hop may be one of, for example, information regarding use of an updated first hop latency budget based on the updated relay latency and information regarding use of an initial first hop latency budget. The relay WTRU 310 may transmit/re-transmit the one or more packet to one of a wireless network (e.g. gNB 314 in FIG. 3)(transmission indicated at 312 in FIG. 3) or another WTRU if there are more than two anticipated hops in the particular transmission. The relay WTRU 310 may transmit the one or more packet based at least in part on the indication regarding the latency budget for the second hop transmission.

The triggering events/conditions, for triggering operation in QoS compensation mode, may be configured in the remote WTRU by the network and/or other WTRUs (e.g., relay WTRU). The triggering events/conditions, which may be monitored and/or detected by the remote WTRU, for initiating operation in QoS compensation mode, may include one or more of the following: an indication from the network, an indication and/or information from the relay WTRU, a buffer status and loading at the remote WTRU ingress/egress buffers and associated RLC channels, change in configuration(s) at the remote WTRU, timing/timestamp information (which may be associated with an expected QoS), measurements on SL/Uu channels/links, property associated with the relay WTRU or SL to which the RLC channel is associated, and/or QoS property associated with the RLC channel.

Regarding the indication/information from the network, for example, a remote WTRU may receive an indication from the gNB indicating to transition to QoS compensation mode, which may be for a certain time duration and/or until one or more event is observed (e.g., expiry of timer and/or increase/decrease in CBR measurements by a CBR threshold value). In another example, the remote WTRU may receive information on any of the following: change in loading at relay WTRU (e.g., increase/decrease of load by a load threshold value), change in expected QoS on the next hop (e.g., over Uu link and/or over $2^{nd}$ PC5 SL), change in configuration applied at the relay WTRU (e.g., adaptation layer configuration and/or ingress/egress RLC channel configuration) and change in configuration applied at the remote WTRU (e.g., change in radio bearer configuration parameters and/or change in priority).

The indication/information may be received by the remote WTRU on the basis of per-relay WTRU, per QoS flow, per E2E radio bearer, per-egress RLC channel at the remote WTRU, and/or per-QoS flow-to-egress RLC channel mapping (e.g., at sidelink adaptation layer), for example. The remote WTRU may receive the indication from the network either directly (e.g., via Uu link) or indirectly via relay WTRU.

Regarding indication/information from the relay WTRU, for example, the remote WTRU may receive information/indication on QoS achievable (e.g., latency, data rate, and/or reliability) when transmitting a PDU in the subsequent hop. The information on QoS may be received by the remote WTRU on a per QoS flow, per radio bearer, RLC channel, or per link basis. The remote WTRU may receive an indication (e.g., flow control indication) on whether to increase/decrease/stop/suspend/resume transmission of PDUs associated with QoS flows, radio bearer, RLC channel or link, for example. For example, the remote WTRU may receive the timing information (e.g., start time/stop time/duration) for suspending or resuming transmission of PDUs to the relay WTRU. In another example, the remote WTRU may receive information on loading/processing status (e.g., when number of PDUs or total payload in buffer increases above a threshold value) and/or change in QoS as a result of increase/decrease in loading/processing at the relay WTRU. In another example, the remote WTRU may receive measurement information/report (e.g., CBR, CR, RSRP of SL channels and/or RSRP of CSI-RS/SSB of Uu link), for example. For example, the information/indication from relay WTRU may be received by remote WTRU in PC5-RRC message, SL MAC CE, adaptation layer control PDU, other control/data PDU from different protocol layers and/or SCI.

Regarding buffer status and loading at remote WTRU ingress/egress buffers and associated RLC channels, the buffer status/loading may include at least a condition associated with any of the following or combinations of measurements (e.g., with respect to an associated threshold value): amount of data (e.g., number of PDUs, amount of payload in terms of bytes/bits) associated with any of the following: one or more QoS flows (from higher layers/application), radio bearers (e.g. from PDCP entities), adaptation layer and RLC/LCH buffers/channels, which may be over a period of time (e.g., over a configured time window); rate of arrival/departure of PDUs in one or more radio bearers (e.g., PDCP entities), adaptation layer and RLC/LCH buffers/channels; average, max, min size of PDUs in one or more radio bearers (e.g., PDCP entities), adaptation layer and RLC/LCH buffers/channels; and/or amount of time spent by one or more PDUs in one or more radio bearers (e.g., PDCP entities), adaptation layer and RLC/LCH buffers/channels. For example, other buffer status metrics that may be monitored by the remote WTRU may include the data received from another remote/relay WTRU (e.g., in previous hops via SL), including the amount of data, rate of arrival/departure of data, amount of time spent by data in buffers, etc.

Regarding change in configuration(s) at the remote WTRU, for example, the remote WTRU may be triggered to perform action(s) when changing the mapping configuration at the SDAP layer, adaptation layer and/or RLC channels (e.g., LCH/MAC configuration), including changing at least one of the parameters in QoS flow to DRB mapping at SDAP, at least one of the parameters LCH configurations at ingress/egress RLC channels (e.g., priority, PDB, PBR, and/or BSD). For example, the remote WTRU may be triggered to perform action(s) and/or send an indication to network and/or relay WTRU when the CDRX and/or DRX configuration parameters (e.g., cycle-time duration, ON-duration, inactivity timer) applied at the remote WTRU is modified/updated, which may possibly impact the transmission/reception pattern and/or QoS achievable during data transmission over SL. For another example, the remote WTRU may be triggered to perform action(s) and/or send an indication to the network when configurations related to the PC5 RLC channel between the remote WTRU and the relay WTRU is changed (e.g., HARQ is enabled/disabled on the PC5 link and/or resource pool used is changed).

Regarding timing/timestamp information, for example, the remote WTRU may track the timing related information (e.g., timestamp, marker or timing control PDU) in the one or more PDUs (e.g., in PDU headers) received from higher layer/application layer, which may be over a time window. The timing information may then be used for determining the expected QoS for the PDUs buffer and/or upcoming PDUs, using a configured mapping relation between the timing information and expected QoS, for example. For example, the timing information may be indicated as the time when the PDUs are created and/or as a deadline/latency/time-to-live bound that may be satisfied on a per-hop and/or end-to-end basis during transport. In another example, the timing information may also be indicated on a count basis (e.g., hop-count). The remote WTRU may trigger an action, which may be based on the timing/timestamp information, for example.

Regarding measurements on SL/Uu channels/links, for example, the remote WTRU may perform measurements over the one or more SL resource pools/BWPs associated with the SL and/or egress RLC channels for triggering an action. The channel related measurements may include SL-RSRP, SL-RSSI, CQI and CSI, and the load related measurements may include CBR and CR, for example. For example, when direct Uu link to network is available, the remote WTRU may perform measurements over the Uu link (e.g., corresponding to RSRP, RSSI, CQI and CSI) for determining the expected QoS.

For example, the remote WTRU may determine the SL conditions based on the number of ARQ/HARQ (ACK/NACK) feedback messages received from the relay WTRU and/or ARQ/HARQ retransmissions made over the one or more SL channels and resource pools associated with the egress RLC channels/links. The expected QoS may then be determined based on a (configured) mapping function between the SL feedback/ReTx count and expected QoS, for example. As an example, a ReTx count above a threshold may translate to poor SL channel conditions, and, hence, reduced expected QoS. In another example, the remote WTRU may determine the SL channel/load conditions based on SL channel/CSI reports or/or SL load/CBR reports sent by the relay WTRU.

The channel/load measurements made over a certain configured time duration may indicate whether the PDUs may be delivered within the expected QoS range in the first-hop or may be expected to exceed the QoS budget, for example. For example, when the measurements made (e.g., CBR measurements) are greater than a threshold, the remote WTRU may determine that the expected QoS may not meet a QoS requirement and/or may determine a corresponding action that may result meeting the QoS requirement.

Regarding property associated with the relay WTRU or SL to which the RLC channel is associated, for example, a remote WTRU may be configured with a property specific to the relay WTRU or a SL such as a priority value associated with the WTRU or SL and/or a configuration parameter enabling/disabling the specific action for the WTRU/link. For example, a WTRU/link configured with high priority may allow the remote WTRU to change the mapping configuration (e.g., at SDAP/adaptation layer) of an RLC channel and/or LCH/MAC configuration (with respect to an initial or default configuration). For example, the remote WTRU may change the LCH/MAC configuration of a high priority WTRU/link as long as the change may impact only the handling of data associated with other lower priority WTRUs/links.

Regarding a QoS property associated with the RLC channel, for example, the remote WTRU may determine whether or not an action can be performed on an RLC channel depending on a QoS-related parameter (e.g., priority value, PDB, PER) configured with that RLC channel. For example, the condition for when to perform an action (e.g., determining an egress RLC channel configuration) may depend on a QoS-related parameter (e.g., priority value, PDB) associated/configured with that RLC channel.

The actions performed by the remote WTRU when detecting any of the triggering events/conditions described above and/or when operating in QoS compensation mode may include one or more of the following: sending an indication/report to the network and/or relay WTRU, changing connectivity to the network/relay WTRU, changing the CDRX or DRX configuration, changing the configuration of RLC channels/LCHs, changing the LCH mapping restriction/rules, changing the LCP configuration at the MAC, changing usage of resources configuration, changing intra-WTRU multiplexing behavior, and/or changing PHY layer configuration/parameters.

Regarding sending an indication/report to the network and/or relay WTRU, for example, the remote WTRU may be triggered to send an indication to the network and/or relay WTRU, which may indicate operation in QoS compensation mode. In an example, the remote WTRU may send an indication/report when estimated QoS and/or channel measurements are made (e.g., RSRP, RSSI, RSRQ, CQI, and/or CSI) on the PC5 link and/or the Uu link are greater than/lower than a configured threshold and/or remains above/below a threshold for a certain time duration.

Regarding changing connectivity to the network/relay WTRU, for example, the remote WTRU may initiate a procedure (e.g., RRC reconfiguration) for requesting the network to reconfigure any of the QoS related configurations (e.g., radio bearers, SDAP, adaptation layer, and/or RLC channels) and/or any of measurement configuration over the SL/Uu link. In an example, the remote WTRU may initiate a procedure for requesting to modify the resource pool configuration associated with SL resources for increasing the resources available to the remote WTRU. For example, the remote WTRU may initiate a procedure for aggregating the available set of resource pools, BWPs, carriers, links, etc. In another example, the remote WTRU may trigger a request for establishing direct connectivity with the network when operating in QoS compensation mode. In another example, the remote WTRU may trigger a procedure for establishing and/or activating connectivity with a second relay WTRU, which may be done while maintaining connectivity or releasing/deactivating connectivity with a first relay WTRU. For example, when connectivity with multiple relay WTRUs is established/available, the remote WTRU may transmit data/PDUs to the multiple relay WTRUs or alternate between one relay WTRU to another.

Regarding changing CDRX or DRX configuration, for example, the remote WTRU may initiate a procedure to change its power saving scheme, including configuration parameters when configured with CDRX or DRX configurations. In an example, the remote WTRU may use and/or select a CDRX/DRX configuration that may result in longer ON-duration and/or inactivity timer for enabling usage and/or monitoring of control/data channel when operating in QoS compensation mode.

Regarding changing configuration of RLC channels/LCHs, for example, the remote WTRU may change the configuration parameters (e.g., priority assigned to LCHs and/or egress RLC channels) such that the PDUs expected to be delayed (e.g., due to expected QoS degradation) may be transmitted with higher priority compared to other PDUs. In an example, the first priority value configured at one or more LCHs may be changed to a second priority value when transmitting one or more PDUs expected to be delayed. The remote WTRU may change the priority associated with an LCH/RLC channel from a first to a second priority value when detecting one or more events/conditions described above (e.g., CBR increases above a threshold value, expected QoS for PDUs decreases by a threshold value). For example, the remote WTRU may change the configuration associated with segmentation/assembly rules at SDAP, PDCP, Adaptation layer, and/or MAC on whether to segment and/or assemble PDUs received from the higher layers when operating in QoS compensation mode. In an example, the remote WTRU may suspend segmenting PDUs at the RLC and/or MAC layer such that the PDUs may be sent faster with available resources when determining the PDUs are expected to be delayed. For another example, the remote WTRU may autonomously activate packet duplication or initiate a procedure for activating packet duplication at any of the protocol layers including SDAP, PDCP, adaptation layer, RLC or MAC layer for increasing reliability when operating in QoS compensation mode.

Regarding change in the LCH mapping restriction/rules, for example, the mapping restrictions at the remote WTRU for mapping between LCHs to one or more resources pools/BWPs may be changed/relaxed such that the PDUs in the LCHs may be transmitted by accessing suitable resources from restricted resource pools when operating in QoS compensation mode. For example, the rules associated with the mapping from the LCH to resources with a max PSSCH duration may be changed during QoS compensation mode such that the remote WTRU may access resources, which may not be typically associated with the LCH, for sending the PDUs expected to be delayed, so long as the compensation amount is less than the max PSSCH duration.

Regarding changing LCP configuration at MAC, for example, the remote WTRU may be configured and/or preconfigured with a first and a second LCP configuration to be applied to the RLC channels/LCHs during scheduling/multiplexing at MAC. In this case, the first LCP configuration may be used during normal/typical operation and the second LCP configuration may be used when operating in QoS compensation mode for compensating any change in the expected QoS for the PDUs in one or more RLC channels/LCHs.

Regarding changing usage of resources configuration, for example, during QoS compensation mode, the remote WTRU operating in Mode 2 may use the SL resources (e.g., periodic, semi-persistent and/or aperiodic) previously selected and/or allocated for sending PDUs from buffers (e.g., in SDAP, adaptation layer, and/or RLC channels) with higher/lower priority and/or from buffers/LCHs/RLC channels that may tolerate increased latency, for sending delayed PDUs and/or PDUs expected to be delayed (e.g., expected to experience QoS degradation). In an example, the remote WTRU may use resources for transmitting the PDUs expected to be delayed when the PDB associated with other PDUs (e.g., from latency tolerant RLC channels) are within the budget for transmission using resources in subsequent time slots/instances. For example, the relay WTRU may do autonomous transmission of other PDUs using a second set of SL resources in the next transmission instance/slot, upon transmitting the PDUs expected to be delayed using the first set of SL resources in the earlier transmission instance/slot. In another example, the remote WTRU may initiate a procedure for changing from operating in Mode 2 to Mode 1 when the remote WTRU is able to access the network and/or when operating in QoS compensation mode. For example, the remote WTRU may use a set of one or more resources with different priority values in a resource pool and/or in an active BWP associated with an RLC channel/LCH for sending the PDUs expected to be delayed. In another example, the remote WTRU may use resources possibly restricted (e.g., allowedCG-List) for URLLC PDUs or other high priority PDUs for delayed PDUs during QoS compensation mode.

The remote WTRU may identify and use resources with the starting slot and duration that may be aligned with the start of QoS compensation mode for the transmitting the PDUs expected to be delayed, for example. In this case, the remote WTRU may send an indication to the relay WTRU and/or an indication (e.g., SR) to the gNB for indicating to activate the identified resources for sending the PDUs with suitable compensation, for example. For example, the remote WTRU may perform resource selection and/or reselection from a one or more configured resource pools such that at least the transmission of PDUs may result in modifying the QoS achievable, such as latency, reliability (e.g., modifying number of HARQ ReTx), diversity (e.g., performing packet duplication), and/or transmission power.

Regarding changing intra-WTRU multiplexing behavior, for example, the remote WTRU may change the rule for multiplexing of PDUs based on different priorities associated with the buffers, including buffers at SDAP, adaptation layer, RLC layer or MAC layer (e.g., LCHs) when operating in QoS compensation mode. In an example related to multiplexing at MAC, if there is overlap for PSSCH resources between low priority LCH (e.g., carrying eMBB PDUs), high priority LCH (e.g., carrying URLLC PDUs) and an LCH carrying delayed PDUs, the remote WTRU may cancel multiplexing of PDUs in low priority LCHs in favor of delayed PDUs and/or high priority PDUs for transmission to relay WTRU.

Regarding changing PHY layer configuration/parameters, for example, the relay WTRU may modify one or more configuration parameters associated with the PHY layer for achieving the desired QoS compensation when transmitting data to the relay WTRU. The remote WTRU may modify the configuration applied for link adaptation, including adjustments/offsets to transmit power, transmission scheme, MCS, coding rate, etc. In an example, the remote WTRU may be configured (e.g., via higher layer signaling, PHY layer signaling) with one or more transmit power levels, where a transmit power level may be expressed in terms of the ratio over a max transmit power level, which may be on the basis of over a number of resource blocks. When QoS operating in compensation mode, the remote WTRU may select and/or use a suitable transmit power level based on the determined expected QoS (e.g., latency, data rate, and/or reliability) for transmitting the PDU, for example. For example, the remote WTRU may use a higher transmit power level for increasing reliability and/or reducing the number of HARQ retransmissions, when determining a lower latency budget for transmitting the PDUs to remote WTRU.

In another example, the remote WTRU configured with a first and second set of MCS, coding and/or spatial transmission schemes (e.g., MIMO schemes with different layers and/or number of antenna ports) may transition to using the second set of MCS/coding/spatial scheme from the first set when operating in QoS compensation mode. For example, the remote WTRU may use a set of higher order modulation, with low coding rate and higher rank for spatial multiplexing for transmitting PDUs faster when in QoS compensation mode, which may occur even when the CSI may not be favorable. The rules for using a suitable set of MCS/coding/spatial schemes in QoS compensation mode may be configured in remote WTRU by network via high layer signaling (e.g., RRC).

In some embodiments, a WTRU may perform resource selection based on congestion on the SL and an indication from the relay WTRU. For example, a remote WTRU may determine SL resources for transmitting data in the UL to the network via the relay WTRU based on at least a determined latency budget over the SL (e.g., first hop), information on loading at the relay WTRU and congestion level over the SL. When the remote WTRU operates in Mode 2, the SL resources may be selected by the remote WTRU from one or more configured resource pools such that the PDUs may be transmitted from remote WTRU to the relay WTRU using the selected resources while meeting a determined QoS budget (e.g., latency and/or data rate) over the first hop, for example. When the remote WTRU operates in Mode 1, the remote WTRU may receive the resource grants from the network (e.g., base station or serving gNB) for performing SL transmission of PDUs to the relay WTRU based on the determined QoS budget, for example. An embodiment of the procedure for resource selection at the remote WTRU for meeting E2E QoS requirements is described below.

The remote WTRU may initially receive configuration information from the network (e.g., base station/gNB), where the configuration information may comprise one or more of the following: E2E QoS requirement, initial QoS budget over the SL, default latency at the relay WTRU, and/or CBR threshold. Regarding the E2E QoS requirement, for example, the QoS requirement may include latency, data rate, and/or reliability, which is expected to be enforced on an E2E basis (e.g., between the remote WTRU and network) when transmitting one or more PDUs via the relay WTRU. Regarding the initial QoS budget over the SL, for example, the initial QoS budget may include a default latency, data rate or reliability value that is expected to be achieved when transmitting PDUs over the SL hop between the remote WTRU and the relay WTRU. In an example, the default QoS may be determined by the network and provided to the remote WTRU. Regarding default latency at the relay WTRU, for example, the initial/default latency may refer to the expected latency to be incurred at the relay WTRU, which may be due to processing, loading and relaying functionalities. Regarding the CBR threshold, for example, the CBR threshold may be used by the remote WTRU for determining the congestion level over the SL resource pool(s) for data transmissions to the relay WTRU. In an example, the CBR threshold may be used by the remote WTRU for determining whether any compensation mechanism may be applied by the remote WTRU and/or the relay WTRU for meeting E2E QoS requirements during data transmissions.

During operation, the remote WTRU may receive one or more PDUs from any of the following: application layer, higher layer (e.g., NAS layer in remote WTRU) and another one or more remote/relay WTRUs in a previous hop via SL. The remote WTRU may receive an indication from the relay WTRU (e.g., in a flow control indication which may be received in a PDU, SL MAC CE, or SCI) indicating the updated latency at the relay WTRU. For example, the updated latency at the relay WTRU may indicate a new value for latency, which may be different/same as the previously indicated default latency at the relay WTRU. In another example, the updated latency at the relay WTRU may indicate the amount of change (e.g., delta change) in the latency value with respect to the default latency at the relay WTRU, received previously. The change in latency may include increase/decrease/no change in terms of the number of time slots, number of symbols, time in ms, for example.

The remote WTRU may determine an updated QoS budget (e.g., latency) over SL for transmitting PDUs to the relay WTRU based on any of the following: an estimated QoS budget over 2nd hop, E2E QoS (e.g., latency), default latency at the relay WTRU (R1) and updated latency at the relay WTRU (R2). The estimated QoS budget over $2^{nd}$ hop may be determined by subtracting the initial QoS budget over SL from the E2E QoS, for example. In an example, the updated latency budget over SL may be determined as follows: E2E QoS−estimated QoS budget over 2nd hop−default latency at the relay WTRU (R2)+updated latency at the relay WTRU (R1).

If the updated QoS budget is greater than or equal to the initial QoS budget, implying the remote WTRU may have a relaxed QoS than an initially allocated QoS budget for data transmission, the remote WTRU may select the resources from a configured resource pool for transmitting the one or more PDUs to the relay WTRU by using a suitable resource (re)selection bound (e.g., T2 bound). The remote WTRU may perform CBR measurements and/or use the latest available CBR information when performing resource (re) selection, for example. The remote WTRU may perform resource (re)selection by setting the determined updated QoS budget (e.g., latency) or the initial QoS budget (e.g., latency) as the resource (re)selection bound, for example.

The remote WTRU may then transmit the PDUs to the relay WTRU using the selected resources. The remote WTRU may also send an indication to the relay WTRU, indicating information on the use of determined updated QoS budget or the initial QoS budget during transmission over the SL hop. The information on the use of the updated/initial QoS budget may be indicated by the remote WTRU by using an associated index, flag and/or a priority value, which may be mapped to the applied QoS budget using a mapping relation configured by the network, for example. For example, the indication indicating the information on the QoS budget applied may be sent by the remote WTRU in any of the following: control/data PDU, SL MAC CE or SCI. For example, the indication sent by the remote WTRU to the relay WTRU, which may be sent in the SCI with the PDUs, and may include the default priority value, associated with the SL channel (e.g., egress RLC channel), when using the initial QoS budget.

If the updated QoS budget is less than the initial QoS budget, implying the remote WTRU may have tighter/stricter QoS than initially allocated QoS budget for data transmission, the remote WTRU may select the resources from a configured resource pool by using a different value than the initial QoS budget (e.g., latency) as the resource (re)selection bound (e.g., T2 bound).

The remote WTRU may determine the CBR of the configured resource pool used for data transmission to the relay WTRU by performing CBR measurements and/or using the latest available CBR measurement information at the remote WTRU. In this case, if the determined CBR is less than the CBR threshold (e.g., received from the network in configuration information), which may imply the congestion level over SL is relatively low and/or resources may be easily available, the remote WTRU may perform resource (re)selection by setting the determined updated QoS budget (e.g., latency) as the resource (re)selection bound, for example. The remote WTRU may then transmit the PDUs to the relay WTRU using the selected resources. The remote WTRU may also send an explicit or implicit indication to the relay WTRU, indicating information on the use of determined updated QoS budget during transmission over the SL hop. For example, information on the updated QoS budget may be indicated (e.g., control/data PDU, SL MAC CE or SCI) by using an associated index, flag and/or a priority value. For example, the remote WTRU may send the indication to the relay WTRU, possibly in the SCI with the PDUs, explicitly or implicitly by sending an associated higher priority value (e.g., matching with the updated QoS budget) than the default priority value associated with the SL channel.

Alternatively, if the determined CBR is greater than or equal to the CBR threshold (e.g., received from network in configuration information), which may imply the congestion level over SL is relatively high and/or resources may not be easily available, the remote WTRU may perform resource (re)selection by setting the determined updated QoS budget (e.g., latency) or the initial QoS budget (e.g., latency) as the resource (re)selection bound, for example. The remote WTRU may then transmit the PDUs to the relay WTRU using the selected resources.

The remote WTRU may also determine a QoS compensation value to indicate to the relay WTRU, which may be for requesting the relay WTRU to compensate for the reduction in the QoS budget available at the remote WTRU when transmitting the PDUs over SL. The QoS compensation value may be determined by the remote WTRU based on the E2E QoS, the initial QoS budget and updated latency at the relay WTRU, for example. For example, the QoS compensation value may be determined as follows: E2E latency−initial QoS budget−updated latency at the relay WTRU. The QoS compensation value may be indicated explicitly or implicitly by the remote WTRU by using an associated index, flag and/or a priority value, which may be mapped to the applied QoS budget using a mapping relation configured by the network, for example. For example, the QoS compensation value be sent by the remote WTRU in any of the following: control/data PDU, SL MAC CE or SCI. For example, the remote WTRU may send the QoS compensation value to the relay WTRU, which may be sent in the SCI with the PDUs, explicitly or implicitly by sending an associated higher priority value (e.g., matching with the QoS compensation value) than the default priority value associated with the SL channel.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
a transceiver and a processor configured to:
receive a configuration, from a wireless network, the configuration indicating an initial first hop latency budget for communications via a relay WTRU,
receive one or more packets from a higher layer,
receive an indication from the relay WTRU,
determine an updated first hop latency budget based at least on the received indication,
perform a channel busy ratio (CBR) measurement on a resource pool associated with a sidelink connected to the relay WTRU based on the updated first hop latency budget being less than the initial first hop latency budget, and transmit the one or more packets using resources selected using the updated first hop latency budget based on the CBR measurement being less than or equal to a CBR threshold.

2. The WTRU of claim 1, wherein the configuration further includes at least one of the CBR threshold, a default relay latency, or an end-to-end (E2E) latency.

3. The WTRU of claim 1, wherein the transceiver and the processor are further configured to transmit information along with the packets, wherein the information is regarding use of the updated first hop latency budget.

4. The WTRU of claim 1, wherein the transceiver and the processor are further configured to transmit the one or more packets using resources selected using the initial first hop latency budget based on the CBR measurement being greater than the CBR threshold.

5. The WTRU of claim 1, wherein the transceiver and the processor are further configured to determine the updated first hop latency budget based on at least one of a determined second hop latency, the E2E latency, or a default relay latency.

6. The WTRU of claim 1, wherein the indication is an indication of an updated relay latency.

7. A method, implemented in a wireless transmit/receive unit (WTRU), the method comprising:

receiving a configuration, from a wireless network, the configuration indicating an initial first hop latency budget for communications via a relay WTRU;

receiving one or more packets from a higher layer;

receiving an indication from the relay WTRU;

determining an updated first hop latency budget based at least on the received indication;

performing a channel busy ratio (CBR) measurement on a resource pool associated with a sidelink connected to the relay WTRU based on the updated first hop latency budget being less than the initial first hop latency budget; and transmitting the one or more packets resources selected using the updated first hop latency budget based on the CBR measurement being less than or equal to a CBR threshold.

8. The method of claim 7, wherein the configuration further includes at least one of the CBR threshold, a default relay latency, or an end-to-end (E2E) latency.

9. The method of claim 7, further comprising transmitting information along with the packets, wherein the information is regarding use of the updated first hop latency budget.

10. The method of claim 7, further comprising transmitting the one or more packets using resources selected using the initial first hop latency budget based on the CBR measurement being greater than the CBR threshold.

11. The method of claim 7, wherein the indication is an indication of an updated relay latency.

* * * * *